United States Patent
Okano et al.

[11] Patent Number: 6,031,915
[45] Date of Patent: Feb. 29, 2000

[54] VOICE START RECORDING APPARATUS

[75] Inventors: Hideo Okano, Hannou; Yuichi Saito, Sagamihara; Masatoshi Tobinai, Hachioji, all of Japan

[73] Assignee: Olympus Optical Co., Ltd., Tokyo, Japan

[21] Appl. No.: 08/690,158

[22] Filed: Jul. 19, 1996

[30] Foreign Application Priority Data

| Jul. 19, 1995 | [JP] | Japan | 7-183073 |
| Aug. 3, 1995 | [JP] | Japan | 7-198741 |
| Aug. 8, 1995 | [JP] | Japan | 7-201933 |

[51] Int. Cl.[7] ................................. H04R 29/00
[52] U.S. Cl. ............................. 381/56; 381/110
[58] Field of Search ............. 381/56, 110; 704/210, 704/215, 233, 231; 379/88.01

[56] References Cited

U.S. PATENT DOCUMENTS

| 3,873,772 | 3/1975 | Dumler . | |
| 4,006,309 | 2/1977 | Brickerd, Jr. . | |
| 4,542,525 | 9/1985 | Hopf | 381/110 |
| 4,893,197 | 1/1990 | Howells et al. . | |
| 4,926,484 | 5/1990 | Nakano | 381/110 |
| 5,259,035 | 11/1993 | Peters et al. | 381/110 |
| 5,293,273 | 3/1994 | Glick . | |
| 5,337,251 | 8/1994 | Pastor | 381/56 |
| 5,485,522 | 1/1996 | Sölve et al. | 381/56 |
| 5,563,952 | 10/1996 | Mercer | 381/56 |
| 5,598,466 | 1/1997 | Graumann | 381/56 |
| 5,619,554 | 4/1997 | Hogan et al. | 379/76 |

FOREIGN PATENT DOCUMENTS

| 3149134A1 | 11/1981 | Germany . |
| 63-259700 | 10/1988 | Japan . |

*Primary Examiner*—Vivian Chang
*Attorney, Agent, or Firm*—Louis Weinstein

[57] ABSTRACT

A voice start recording apparatus includes a voice level determining circuit for determining whether consecutive frames of input voice is sound or silent, each frame being a coded voice signal; a continuity monitoring circuit for monitoring continuity of sound frames or silent frames; and a recording control circuit for controlling the start and stop of a recording operation based on the output from the continuity monitoring circuit.

12 Claims, 14 Drawing Sheets

VOICE START RECORDING APPARATUS

BACKGROUND OF THE INVENTION

1. Field of the Invention

The present invention relates to a voice start recording apparatus and, more particularly, to a voice start recording apparatus which automatically starts/stops a recording operation in response to predetermined voice.

2. Related Art Statement

In recent years, there is provided a recorder in which a voice signal obtained by a microphone or the like is converted into a digital signal, the digital signal is stored in, e.g., a semiconductor memory, the voice signal is read from the semiconductor memory to be converted into an analog signal in a reproducing operation, and the analog signal is outputted as voice by a loudspeaker or the like. Japanese Unexamined Patent Publication No. 63-259700 discloses an example of the recorder described above.

In the general recorder type described above, in order to save an amount of data recorded on the semiconductor memory, an amount of generated data is decreased as much as possible by performing high-efficient coding to a digital voice signal.

There is also provided a scheme of performing a compressing process to a silent portion to obtain the high efficient coding. It is generally known that general dialogue includes a silent portion, and that a bit rate can be decreased by about 30% by compressing the silent portion.

As a voice recording apparatus, e.g., a tape recorder for conference recording, a recorder which automatically starts a recording operation in response to voice and stops the recording operation a predetermined period of time after the voice is interrupted is known. In a recording standby state, when such a recorder receives voice having a predetermined start level (adjustable by a user), the recorder starts a recording operation. When the input voice has a level lower than the predetermined level, the recorder stops the recording operation 3 to 4 seconds later.

More specifically, when voice having a level equal to or higher than the predetermined start level, the recorder determines that "sound" is set to start a recording operation; when the input voice has a level lower than the predetermined level, the recorder determines that "silence" is set to stop the recording operation.

However, in the recorder described above, the following drawbacks occur. That is, a recording operation is erroneously started by environment noise such as sound generated by opening/closing a door or coughs, and the recorder cannot be stopped when the recorder must be stopped because of external noise. In addition, a leading portion is disadvantageously cut at the start of a recording operation.

In the voice recording apparatus comprising an automatic voice starting function, a start/stop level of a recording operation is fixed in the apparatus itself, or a user must operate a volume or a sensitivity switching switch to set the level to be a desired start level in advance.

However, a means for setting the start/stop level cannot easily set a proper level by catching input voice which always changes, and the start level must be sought after a trial recording operation is performed.

In the above voice start recording apparatus, as a setting switch to operate the voice start recording function, a devoted operation member must be arranged. If the devoted operation member is not used, a setting switch having a rapid hearing reproducing function or the like is also used as the set switch for the voice start recording function. In this case, a predetermined operation must be performed to operate the voice start recording function.

However, when devoted operation members corresponding to the functions described above are independently arranged, the apparatus itself increases in size, and the increase in size of the apparatus limits a compact design. In addition, workability in an assembling operation is degraded with an increase in the number of members, and manufacturing costs may disadvantageously increase.

When the operation member or the like for the voice start recording function is also used as an operation member for another function, in use of the apparatus, the operability of each operation member is degraded.

When the operation member or the like for the voice start recording function is also used as an operation member for another function, in general, a general contact-fixed type mechanical slide switch or the like is generally applied. In this case, unless an operation such as a mode switching operation is performed, the recording apparatus is fixed to a mode state set by the above operation member or the like.

Therefore, when use of the above recording apparatus or the like is to be started by another set mode but a set mode set when the apparatus is previously used, a switching operation or the like is performed prior to the start of use, and a switching operation to a desired set mode must be performed. That is, a preparing operation before use of the recording apparatus is started is disadvantageously cumbersome.

OBJECTS AND SUMMARY OF THE INVENTION

It is a first object of the present invention to provide a voice start recording apparatus which is not erroneously operated by external noise.

It is a second object of the present invention to provide a voice start recording apparatus which can reliably and easily set a voice start level and a recording standby level.

It is a third object of the present invention to provide a voice start recording apparatus which can easily set a mode for a voice start recording function without specially arranging a devoted operation member for operating the voice start recording function.

Briefly, the voice start recording apparatus according to the present invention includes the following means:
voice level determining means for determining whether input voice is sound or silent in units of frames, each of which codes a voice signal;
continuity monitoring means for monitoring continuity of a sound frame or a silent frame; and
recording control means for controlling the start and stop of a recording operation on the basis of an output from the continuity monitoring means.

These as well as other objects and advantages of the present invention will become further apparent from the following detailed expression.

DETAILED DESCRIPTION OF THE PREFERRED EMBODIMENTS

Embodiments of the present invention will be described below with reference to the accompanying drawings.

Figure 1:
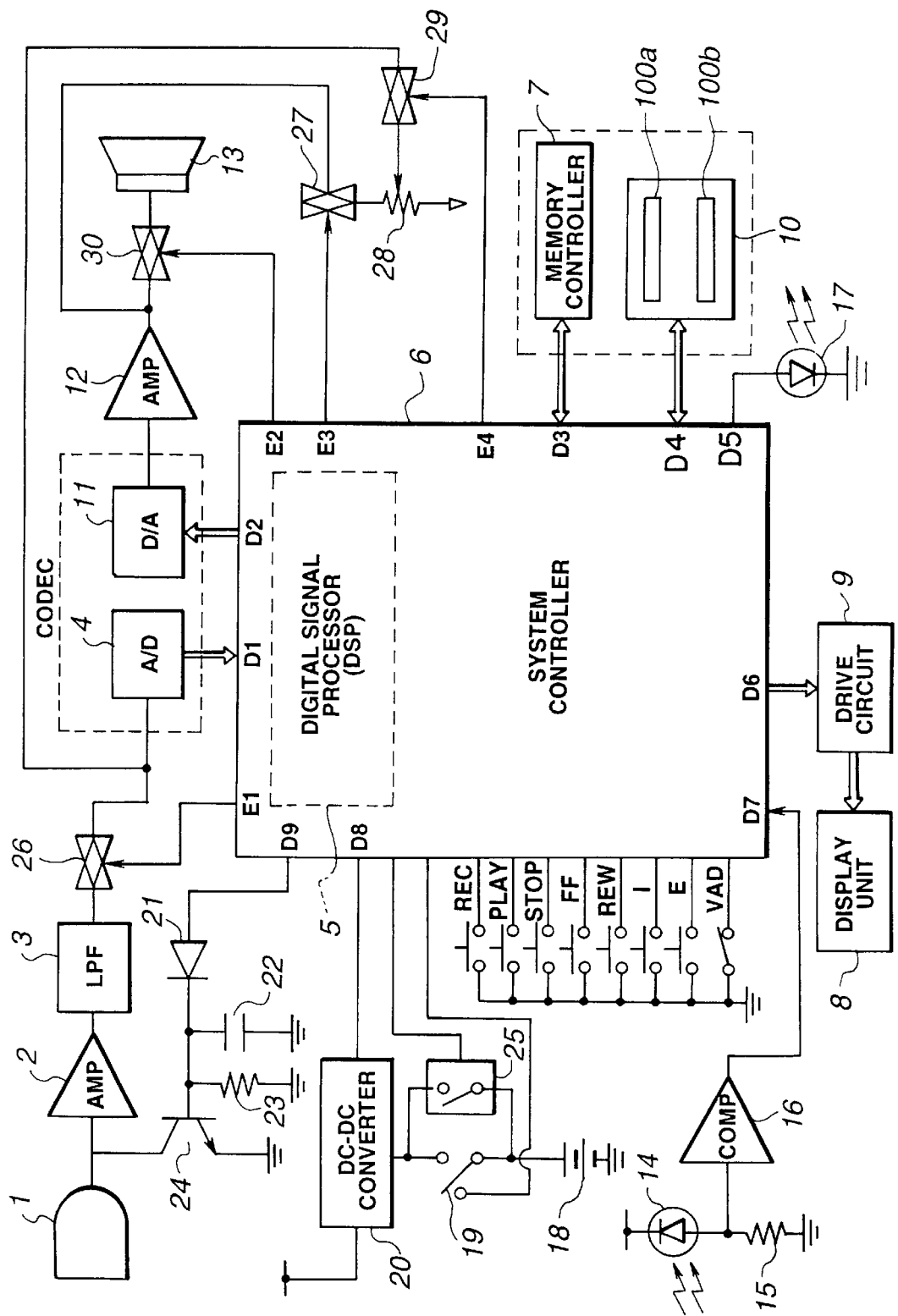
FIG. 1 is a block diagram showing the arrangement of a voice start recording apparatus according to a first embodiment of the present invention.

FIG. 1 is a block diagram showing the arrangement of a voice start recording apparatus according to the first embodiment of the present invention.

As shown in FIG. 1, the voice start recording apparatus according to this embodiment comprises a microphone 1. A voice signal from the microphone 1 is input to an analog/digital (A/D) converter 4 through an amplifier (AMP) 2, a low-pass filter (LPF), and an analog switch 26. An output terminal of the A/D converter 4 is connected to a first terminal D1 of a system controller 6.

This system controller 6 incorporates a voice compressing/expanding means, a time axis compressing means, a means for detecting or predicting an input signal level, a digital signal processor (DSP) 5 serving as a constituent element of a data processing means. The first terminal D1 is connected to the digital signal processor (DSP) 5 in the system controller 6.

The system controller 6 also functions as a voice level determining means for determining whether an input voice level is a voice level which satisfies predetermined conditions. The voice level which satisfies the predetermined conditions means a voice level which is equal to or higher than a reference level or which is lower than the reference level. For example, in this embodiment, "sound" is determined when the level is equal or higher than the reference level, and "silence" is determined when the level is lower than the reference level. Therefore, when the reference level is set as described above, it can be determined whether input voice is "sound" or "silence".

"Silence" does not always mean that the voice level is zero. As described above, a certain reference level is set. When an input level is lower than the reference level, it is determined that it is "not sound", and "not sound" can be recognized as "silence".

In addition, the system controller 6 determines the voice levels in units of frames each of which codes a voice signal.

The system controller 6 also functions as a continuity monitoring means which monitors the continuity of a frame of a voice level which satisfies the predetermined conditions, e.g., a sound frame or a silent frame. The above frame units will be described later.

The system controller 6 also functions as a recording control means for controlling the start or stop of a recording operation on the basis of the continuity monitor result. Note that the details of the recording control means will be described later. In this case, a monitoring operation for the continuity of a sound frame or silent frame performed by the continuity monitoring means may be performed in the following manner. As in a method (to be described later, in place of actual counting of the number of frames, for example, time is measured using a timer, and it is monitored whether the sound frame or the silent frame continues for a predetermined period of time or more.

The voice start recording apparatus of this embodiment comprises a loudspeaker 13 serving as a voice output means. The loudspeaker 13 is connected to a second terminal D2 of the system controller 6 through an analog switch 30, an amplifier (AMP) 12, and a digital/analog (D/A) converter 11.

The analog switch 26 is connected to a control terminal E1 of the system controller 6, and is controlled to be turned on in a recording operation. The analog switch 30 is connected to a control terminal E2, and is controlled to be turned on in a reproducing operation.

An analog switch 27 is connected between the AMP 12 and the analog switch 30, and is also connected to the voltage supply terminal of a variable resistor (VR) 28. The analog switch 27 is connected to a control terminal E3 of the system controller 6, and is controlled to be turned on when the state of the variable resistor 28 is detected.

An analog switch 29 is connected between the A/D converter 4 and the analog switch 26, and is also connected to the intermediate tap terminal of the variable resistor (VR) 28. The analog switch 29 is connected to a control terminal E4 of the system controller 6, and is controlled to be turned on when the state of the variable resistor 28 is detected.

The variable resistor 28 is used to change the threshold value of a reference level when the system controller 6 serving as the voice level determining means determines whether the level is sound or silent. At this time, the system controller 6 and the variable resistor 28 function as threshold value setting means.

When the timing of the start or stop of a recording operation is changed by changing the number of predetermined frames which are continuously detected, the variable resistor 28 is used to change the timing. At this time, the system controller 6 and the variable resistor 28 function as recording timing changing means.

A third terminal D3 of the system controller 6 is connected to a memory control circuit 7, and a fourth terminal D4 is connected to a semiconductor memory section 10 which is detachable from the recording/reproducing apparatus.

A fifth terminal D5 of the system controller 6 is connected to a light-emitting diode 17 serving as a data transmitting means for transmitting data recorded on the semiconductor memory section 10 or an output means for outputting at signal representing a receivable. An infrared-emitting diode is used as the LED 17 when the LED 17 is used to transmit data. However, the LED 17 is also used as a display unit which emits light when sound is input to or output from the microphone 1 during a recording or reproducing operation.

Therefore, as the LED 17, an infrared LED which includes a large amount of visible light component and has a relatively short wavelength having, e.g., a peak wavelength of 500 mm to 1,000 mm, preferably, 600 mm to 800 mm.

In addition, a sixth terminal D6 of the system controller 6 is connected to a display unit 8 through a drive circuit 9.

A memory control circuit 7 of the system controller 6 is connected to a contact point between a PIN diode 14 and a resistor 15 through a voltage comparator (COMP) 16 and terminal D7 of system controller 6. In this case, the PIN diode 14, and the voltage comparator 16 constitute a data receiving means or a means for receiving a data transfer start signal.

An eighth terminal D8 of the system controller 6 is connected to a battery 18 through a DC-DC converter 20 and a main power supply switch 19. The DC-DC converter 20 outputs a voltage boosted from the battery 18, and supplies a stable power supply voltage to each means. At the same tide, the DC-DC converter 20 transmits a signal which notifies that the voltage of the battery 18 is smaller than a predetermined value. In this manner, the system controller 6 detects a consumption state of the battery 18.

The main power supply switch 19 is connected in series with a relay 25 such that power supply is prevented from being stopped even if the main power supply switch 19 is turned off. In order to detect that the main power supply switch 19 is turned off, the main power supply switch 19 is connected to the system controller 6 such that the voltage of the battery 18 can be detected when the main power supply switch 19 is turned off.

In addition, the anode of a diode 21 is connected to a ninth terminal D9 of the system controller 6, and a parallel circuit constituted by a capacitor 22 and a resistor 23 is connected between the cathode and ground of the diode 21. The cathode of the diode 21 is connected to the base of a transistor 24. The collector of the transistor 24 is connected to a contact point between the microphone 1 and the microphone amplifier 2, and the emitter is connected to the ground. These constitute an AGC (Auto Gain Control) circuit to reduce generation of distortion caused by an excessive input.

In addition, operation buttons such as a recording button (REC), a reproducing button (PLAY), a stop button (STOP), a fast feeding button (FF), a first rewinding button (REW), an Instruction mark button (I), an END mark button (E), and a voice start (voice active detector) button (VAD) are connected to the system controller 6.

As shown in FIG. 1, the semiconductor memory section 10 comprises a temporary recording medium portion 100a and a main recording medium portion 100b. Although a flash memory is generally used as the main recording medium portion 100b, an magneto-optical disk, a magnetic disk, or a magnetic tape is used as the main recording medium portion 100b. As the temporary recording medium portion 100a, an SRAM, a DRAM, an EEPROM, a high dielectric memory, or a flash memory, which can perform reading/writing at a speed higher than that of the main recording medium portion 100b, may be employed. In this embodiment, an SRAM is used as the temporary recording medium portion 100a, and a flash memory is used as the main recording medium portion 100b.

Figure 2:
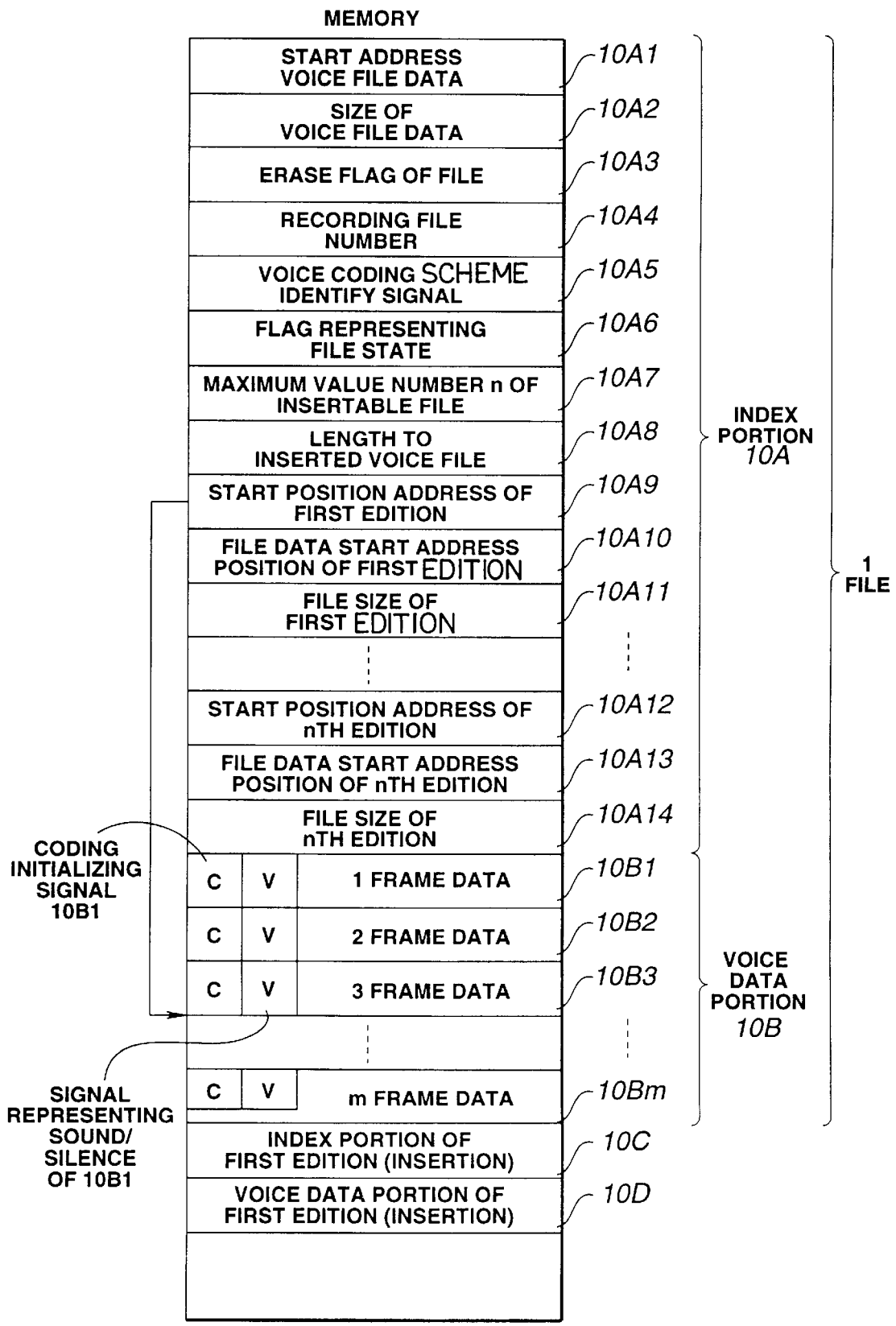
FIG. 2 is a view showing the recording arrangement of a semiconductor memory section in the voice start recording apparatus according to the first embodiment.

FIG. 2 is a view showing the recording arrangement of the semiconductor memory section 10.

As shown in FIG. 2, the memory space of the semiconductor memory section 10 is roughly divided into an index portion 10A and a voice data portion 10B. In the voice data portion 10B, a plurality of voice message files 10B1, 10B2, 10B3, . . . , 10Bm which are recorded on the voice data portion 10B are recorded.

In the index portion 10A, the following information are recorded. That is, the index portion 10A is constituted such that next voice file start address position information 10A1; one-file size information 10A2; file erasing information 10A3; a recording file number 10A4; voice coding scheme recognizing information 10A5; information 10A6 representing a file state; maximum value information 10A7 of a file which can be edited (inserted); information 10A8 representing a length to an insertable file; an edition start position address 10A9 of the first edition; a start position address 10A10 of an inserted voice file of the first edition; and size information 10A11, . . . ; an edition start position address 10A12 of the nth edition in which maximum information can be performed to sequentially record information similar to the information 10A9 to 10A11; start position address 10A13 of an inserted voice file of the nth edition in which maximum insertion can be performed; and start position address 10A14 of an inserted voice file of the nth edition in which maximum insertion can be performed are recorded.

The voice frame data 10B1 to 10Bm are recorded on the voice data portion 10B. In each frame data of the voice data portion 10B, information representing whether initial setting is performed when the voice coding process is performed is recorded.

The position at which the information is recorded is allocated to the uppermost bit or lowermost bit of the first byte of each frame data, or is allocated to the uppermost bit or lowermost bit of the last byte of the frame data. In this embodiment, the information is recorded at the fourth bit of the first byte of the frame data.

In the semiconductor memory section 10, an address serving as information representing a recording position of voice information is stored in the detachable semiconductor memory section 10. However, the address may be recorded in a semiconductor memory (not shown) controlled by the memory control circuit 7 arranged on the recording/reproducing side.

In this case, the Instruction mark and END mark are as follows. That is, when the Instruction mark button I is operated by a document recording person during a recording operation, an indicating index mark for a typist or secretary can be recorded. The document recording person can practically indicate attention in typing or the priority with voice by using the Instruction mark.

In order to indicate partitions between the plurality of documents, the END mark button E is operated to record an index mark called an END mark.

A recording/reproducing operation of the first embodiment arranged as described above will be briefly described below.

When a recording operation is to be performed, an analog voice signal obtained from the microphone 1 is amplified by the microphone amplifier 2 to limit the frequency band of the analog voice signal through the low-pass filter 3, and the analog signal is converted into a digital signal by the A/D converter 4 to be input to the digital signal processor (DSP) 5 in the system controller 6.

In this case, when a signal input from the microphone 1 is higher than a reference level, e.g., higher than −6 dB of the maximum range of the A/D converter 4, a pulse is output to the diode 21 connected to the ninth terminal D9 of the system controller 6, and charges are stored in the capacitor 22 to apply a voltage to the transistor 24. At this time, an impedance between the microphone amplifier 2 and the transistor 24 changes, and a signal input to the microphone amplifier 2 is limited, thereby adjusting a gain. Note that the charges stored in the capacitor 22 are gradually discharged by the resistor 23.

In response to an operation of a plurality of operation buttons and switches of the system controller 6, voice data obtained by compressing a digital signal by the digital signal processor 5 is recorded on the semiconductor memory section 10 through the third terminal D3 and the fourth terminal D4 of the system controller 6.

In a reproducing operation, the system controller 6 reads data recorded on the semiconductor memory section 10 and supplies the data to the digital signal processor 5 to expand the data. The voice data expanded by the digital signal processor 5 is converted into analog signals by the D/A converter 11, amplified by the AMP 12, and then output as voice from the loudspeaker 13. The system controller 6 controls the drive circuit 9 to cause the display unit 8 to display various information such as an operation mode.

An operation of the voice start recording apparatus according to this embodiment arranged as described above will be described below.

Figure 3:
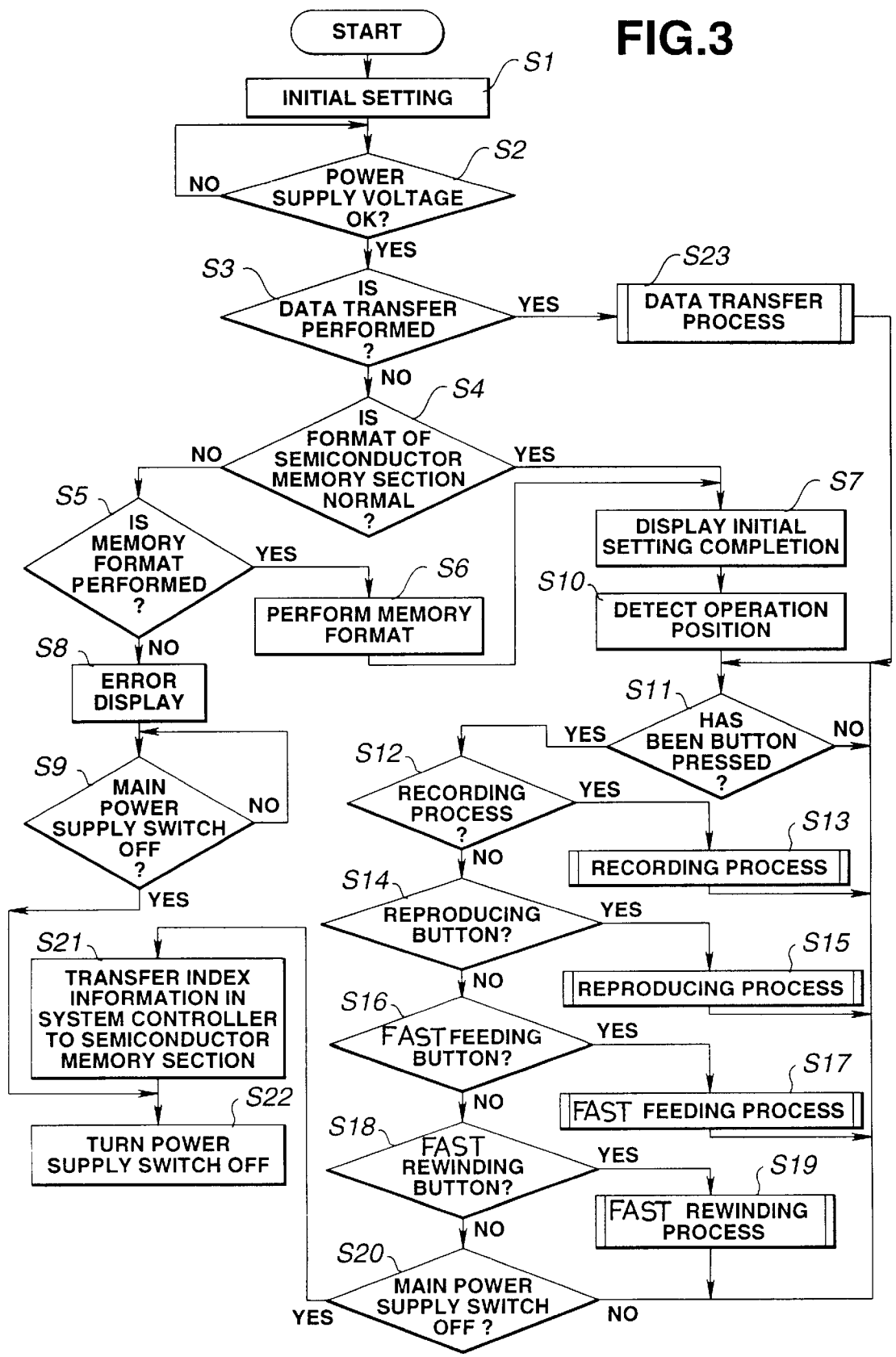
FIG. 3 is a flow chart showing a main operation in the voice start recording apparatus according to the first embodiment.

FIG. 3 is a flow chart showing a main operation in the voice start recording apparatus according to this embodiment. The operation will be described below as an operation of the system controller 6.

When the battery 18 is set to supply power, the system controller 6 starts the operation shown in the flow chart. That is, the external conditions of the system controller 6 and initial setting of the storing section in the system controller 6 are performed (step S1).

Upon completion of initial setting, the system controller 6 detects whether the power supply voltage of the battery 18 is a rated value (step S2). The rated value is set to be 1 V, and the system controller 6 detects, on the basis of information from the DC-DC converter 20, whether the power supply voltage of the battery 18 is 1 V or higher or whether the impedance of the battery 18 from a current flowing in the battery 18 is larger than the rated value. At this time, a signal obtained by determining the state of the battery 18 is input to the eighth terminal D8 of the system controller 6, so that the system controller 6 can detect whether the battery 18 has a usable capacity (step S2).

If the system controller 6 detects that the battery 18 cannot be used as a detection result in step S2, power supply to the entire voice start recording apparatus is stopped, and switches (not shown) arranged between the battery 18 and respective circuits are turned off, and a display representing that the battery 18 has no capacity is performed through the drive circuit 9 and the display unit 8.

If the system controller 6 detects that the battery 18 can be used as a detection result in step S2, the relay switch 25 is turned on. Thereafter, the system controller 6 checks whether the relay 25 or the stop button ST and the fast feeding button FF are simultaneously pressed, thereby determining whether data transfer is performed (step S3). If YES in step S3, a data transfer process is started.

If NO in step S3, the system controller 6 loads information of the index portion 10A by the semiconductor memory section 10 serving as a recording medium (memory section). More specifically, the system controller 6 loads the operation start position information 10A1, operation end position information 10A2, other coding modes, operation conditions, and the like (see FIG. 2).

Thereafter, the system controller 6 determines, on the basis of data loaded from the semiconductor memory section 10, whether the semiconductor memory section 10 has normally recorded indexes, i.e., whether the format of the semiconductor memory section 10 is normal (step S4).

If the semiconductor memory section 10 is unformatted in step S4, it is determined that the format of the semiconductor memory section 10 is not normal. Information representing using conditions is input to the index portion 10A of the semiconductor memory section 10, and it is checked whether a memory format (initialization) serving as a process of inputting "0" to the voice data portion 10B is performed (step S5). More specifically, the drive circuit 9 is controlled to cause the display unit 8 to display confirmation to check whether the memory format is performed.

In this case, when a button (also used as a recording button REC) for indicating and confirming that the memory format process is performed has been pressed, format (initialization) of the semiconductor memory section 10 is performed (step S6). Upon completion of the format, the drive circuit 9 is controlled to cause the display unit 8 to display initial setting completion (step S7).

If a button (also used as a stop button ST) for indicating and confirming that the memory format process is performed has been pressed, the system controller 6 controls the drive circuit 9 to cause the display unit 8 to display that the semiconductor memory section 10 is not normal and to indicate and display that the semiconductor memory section 10 must be replaced. In addition, the switches (not shown) arranged between the battery 18 for supplying power to the entire voice start recording apparatus and the respective circuits are turned off (step S8).

Thereafter, in order to change the semiconductor memory section 10, the system controller 6 waits until the main power supply switch 19 is turned off (step S9). When the system controller 6 detects that the main power supply switch 19 is turned off, the flow is shifted to step S22.

When initial setting for the semiconductor memory section 10 is normally completed, upon completion of display of initial setting completion, an operation at present is performed on the basis of information read from the index portion 10A (step S10). Thereafter, the system controller 6 sets the respective circuits in a standby state while detecting a specific operation button of the voice start recording apparatus which has been pressed (step S11).

If the system controller 6 detects that any operation button has been pressed in step S1, the system controller 6 detects whether the pressed button is the recording button REC (step S12). If the recording button REC has been pressed, the system controller 6 controls the digital signal processor 5 to compress voice information input from the A/D converter 4, and controls the memory control circuit 7 to perform a recording operation for the voice data portion 10B of the semiconductor memory section 10 (subroutine of a recording process in step S13). Note that the subroutine of the recording process will be described later.

When the recording button REC is not operated, the system controller 6 next detects the state of the next reproducing button PL (step S14). In this case, if the reproducing button PL has been pressed, the system controller 6 controls the memory control circuit 7 to read recorded data from the voice data portion 10B of the semiconductor memory section 10, sends the data to the digital signal processor 5 to perform an expanding process, and starts a reproducing operation for sending voice information to the D/A converter 11 (step S15). Note that the subroutine of the reproducing process will be described later.

When the reproducing button PL has not been pressed, the system controller 6 detects the states of the buttons to check whether the fast feeding button has been pressed (step S16). When the fast feeding button FF is pressed, the system controller 6 starts a fast feeding process in which operation positions are sequentially moved at a proper speed, e.g., a speed twenty times a reproducing speed (step S17).

If the fast feeding button FF has not been pressed, the system controller 6 detects the states of the buttons to check whether the fast rewinding button REW has been pressed (step S18). If the fast rewinding button REW has been pressed the system controller 6 starts a fast rewinding process in which operation positions are sequentially moved at a speed equal to a speed as in the fast feeding process (step S19).

In each of the-processes in steps S13, S15, S17, and S19, if the stop button ST has been pressed, the system controller 6stops these processes, and the flow returns to step S11.

When the recording button, reproducing button, fast feeding button, fast rewinding button, or the like is not operated, the system controller 6 turns the power supply off or detects the states of setting buttons of various types (step S20). In step S20, when the power supply of the main power supply switch 19 is turned off, the system controller 6 controls the memory control circuit 7 to record the index information stored in a memory section (not shown) in the system controller 6 on the index portion 10A of the semiconductor memory section 10 in order to update the information in the index portion 10A of the semiconductor memory section 10 (step S21).

Upon completion of the index transferring process, the system controller 6 turns off the entire voice start recording apparatus, i.e., the relay switch 25 for supplying power to the respective circuits (step S22).

If the system controller 6 determines in step S20 that the semiconductor memory section 10 is set in an OFF state, the system controller 6 detects a setting button, and stores the state of the setting button in the memory section in the system controller 6. Thereafter, the flow returns to step S11;

In this embodiment, the above setting buttons are not devoted. More specifically, when several buttons selected from the recording button REC, the reproducing button PL, the stop button ST, the fast feeding button FF, the fast rewinding button REW, the Instruction mark button I, the END mark button E, a voice start (silent compression) button VAD are simultaneously pressed, functions of the setting buttons can be obtained.

Figure 4:
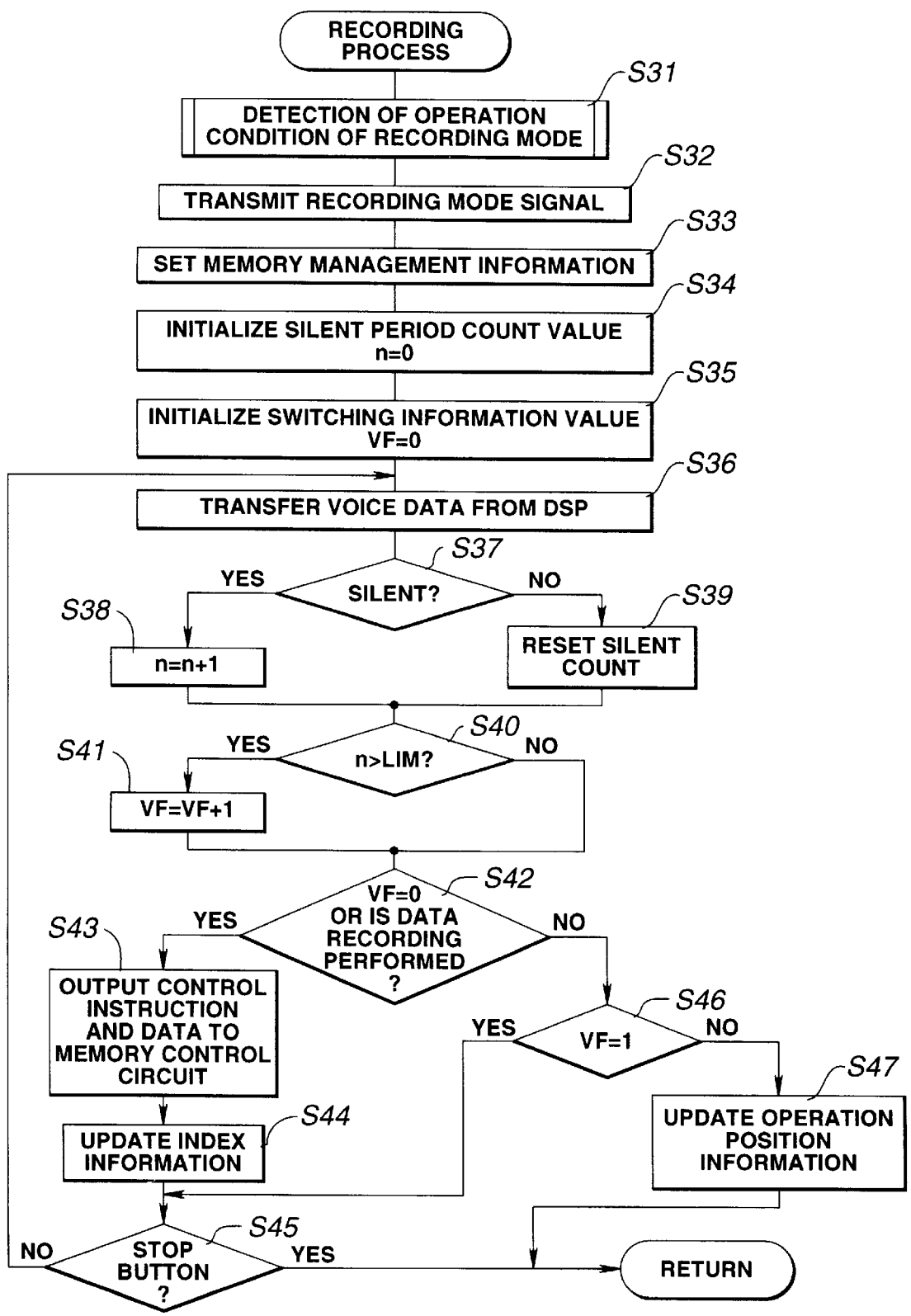
FIG. 4 is a flow chart showing a subroutine of a recording process in the voice start recording apparatus according to the first embodiment.

The subroutine of the recording process shown in step S13 will be further described below with reference to the flow chart in FIG. 4.

If the system controller 6 detects that the recording button REC has been pressed, the system controller 6 executes the recording process. Voice recording conditions (e.g., voice start, use of variable type of application of silent compression or a voice compression rate, or the like) at this time is detected (step S31).

Figure 5:
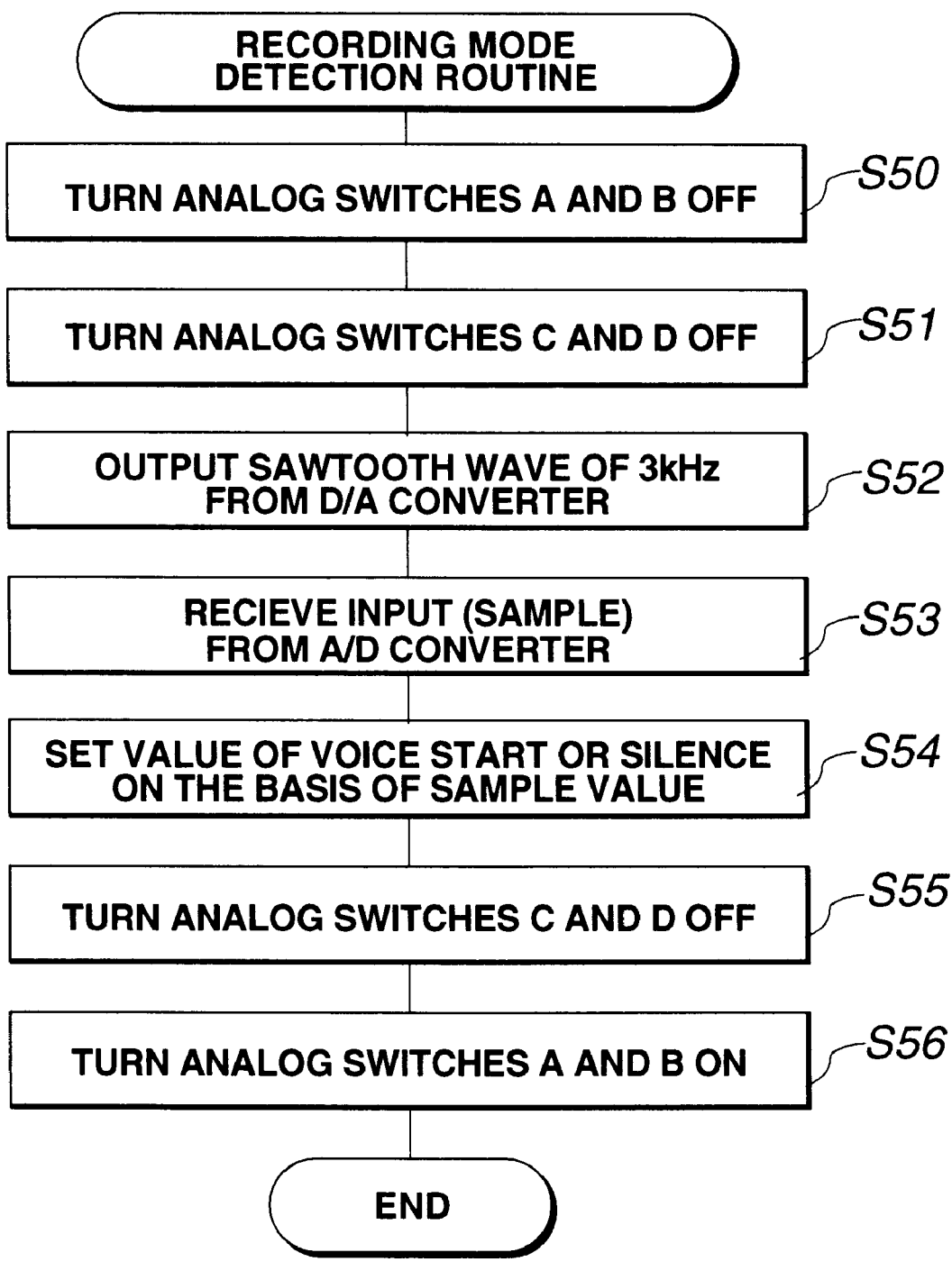
FIG. 5 is a flow chart showing a subroutine of a recording mode detecting process in the voice start recording apparatus according to the first embodiment.

A routine for detecting the operation conditions of the recording mode shown in step S31 will be described below with reference to FIG. 5.

The system controller 6 shifts the flow to this routine at the start of the operation to set an input level value at which voice start or silent compression is performed. The system controller 6 turns the analog switches 26 and 30 off (see FIG. 1) to prevent sound from being generated (step S50). Referring to FIG. 5, the analog switches A and B correspond to the analog switches 26 and 30, respectively.

The system controller 6 turns the analog switches 27 and 29 on to perform power supply for the variable resistor 28 on the basis of an output from the D/A converter 11 and to make it possible to detect a voltage value converted into a variable position of the variable resistor 28 on the basis of an output from the A/D converter 4 (step S51). Note that, referring to FIG. 5, analog switches C and D correspond to the analog switches 27 and 29, respectively.

The system controller 6 sends an instruction for preparing the digital signal processor 5 to output a sawtooth wave having a cycle of 3 kHz from the D/A converter 11 (step S52).

The system controller 6 detects a sample value obtained 12.5 $\mu$sec after the digital signal processor 5 is instructed to output the sawtooth wave having a cycle of 3 kHz, and the system controller 6 sends an instruction for receiving the sample value from the digital signal processor 5 through the A/D converter 4 (step S53).

This sample is an output from an intermediate tap of the variable resistor 28 (to E4), and is dependent on the position of the variable resistance of the variable resistor 28. For this reason, the system controller 6 sets detection of sound/silence or sets the set value of the voice start process by using a value obtained by converting the sample value (step S54).

Thereafter, the system controller 6 turns the analog switches 27 and 29 off, and stops power supply to the variable resistor 28 on the basis of an output from the D/A converter 11 (step S55). In addition, the system controller 6 turns the analog switches 26 and 30 on to make it possible to detect input voice from the microphone 1 (step S56), and the flow returns.

Returning to FIG. 4, the system controller 6 sends a voice recording condition mode to the digital signal processor 5 on the basis of the conditions detected by the recording mode detecting routine to set an input start level for voice start and to set a detection value for determining sound/silence (step S32).

In this embodiment, when the digital signal processor 5 determines "silence", the system controller 6 does not perform a recording operation in the semiconductor memory section 10. However, since voice data may be erroneously deleted by the input level of a consonant or a sound/silence determination level, a silence correcting process in which voice data is not recorded on the semiconductor memory section 10 when silence continues in the system controller 6 for 3 to 500 frames may be added.

The frame determination number at which voice data is stored in the memory section when silence continues for 3 to 500 frames in the silence correcting process of the system controller 6 is set depending on the conditions detected in the recording mode detecting routine described above.

The system controller 6 loads the state of the memory on memory management address information (operation position information) to set the memory management address information in the memory section of the system controller 6. The system controller 6 records attribute information such as next voice file start address position information 10A1, one-file size information 10A2, file erasing information 10A3, a recording file number 10A4, voice coding scheme recognizing information 10A5, information 10A6 representing a file state, and maximum value information 10A7 of a file which can be edited (inserted) in the index portion 10A. In addition, voice frame data 10B1, 10B2, 10B3, . . . , are sequentially recorded on the voice data portion 10B from the voice frame data 10B1. In this case, when new voice data is inserted by an editing operation, the inserted voice data is recorded as a new voice file, and information 10A8 representing a length to an insertable file, an edition start position address 10A9 of the first edition, a start position address 10A10 of an inserted voice file of the first edition, and size information 10A11 of the file of the first edition are recorded on the index portion. In this embodiment, the same insertion recording process as described above can be performed n times at most.

The memory management information such as a position at which voice coding data is recorded or the size of the data is loaded or calculated in the system controller 6 (step S33). A silent period count value for measuring a silent period of time is set to be "0" which is an initial set value (step S34). A value VF representing switching information of a voice start mode of the voice start recording apparatus is set to be "0" which is an initial set value (step S35).

Data obtained by compressing and coding voice by the digital signal processor 5 is transferred from the system controller 6 to the semiconductor memory section 10 as voice recording data (step S36).

In this embodiment, an analysis/synthesis type voice coding scheme such as a CELP (Code Excited Linear Predictive Coding) scheme in which an excited (residual) signal is vector-quantized by using a code book is preferably used in the digital signal processor 5. A waveform coding type compressing scheme such as an ADPCM scheme may also be used.

In voice coding using the CELP scheme, an input voice signal is recognized as one frame in a predetermined period of time (e.g., 20 msec) (for example, 160 data are recognized as data of one frame when a sample frequency is 8 kHz), the following parameters are introduced by using the data of one frame.

The digital signal processor 5 calculates a linear predictive coefficient (LPC) (short-term predictive filter coefficient, reflection coefficient, or the like) and quantizes the coefficient to obtain a parameter. Similarity of the excited (residual) signal model (code book) of several pieces of sound source information is determined as sound source information data to find the most similar model. The number (index) of the excited (residual) signal model of the sound source information at this time and gain information are quantized, thereby performing a coding process.

In this coding process, the digital signal processor 5 analyzes whether one frame is silent, and sends coded data in step S36. As a method of detecting whether one frame is silent, the following method is used. That is, the energy of data of one frame (sum of second powers sample data) or correlation between the maximum value of a voice signal and a residual signal in one frame is calculated to determine whether the frame is silent. Silence and sound are coded as "0" and "1", respectively, to be output.

The system controller 6 determines, on the basis of data output by data transfer performed by the digital signal processor 5, whether the data is silent (step S37).

If YES in step S37, "1" is added to the silent period count value n to increment the silent period count value n (step S38). If NO in step S37, the silent period count value n is reset to set the initial set value to be "0" (step S39).

In order to determine whether silence continues for a predetermined period of time or more, the system controller 6 determines whether the silent period count value n is, e.g., LIM=500 or more, (this means that silence continues for 500 frames, and determines that silence continues for 10 seconds) (step S40). This determination value LIM falls within the range of 5 to 65,535, preferably, 100 to 3,000, more preferably, 150 to 500. In this embodiment, the determination value is set to be 500.

If the determination value LIM is 500 or more in step S40, the system controller 6 adds "1" to a switching information value VF (step S41). The information value VF set to be "0" indicates an initial setting state, and the information value VF set to be "1" indicates a voice start (silent compression) mode. When the information value VF is "2" or more, a switching operation to a stop state is performed. When silence continuously occurs, the determination value LIM may be changed by a frequency of occurrence of silence. For example, the determination value LIM may be changed depending on the information value VF. That is, when the information value VF is "0", the determination value LIM is set to be 500; and when the information value VF is "1", the determination value LIM is set to be 50.

Since a variable value is used as the determination value LIM, when a speaker talks with many intervals (e.g., when dictation recording is performed while thinking), an operation for automatically switching a mode to a recording mode in which a recording medium is efficiently used is performed.

The system controller 6 determines whether the information value VF is "0" or whether the silence correction process in which voice data is prevented from being stored in the semiconductor memory section 10 is performed (step S42). In this case, when the information value VF is "0" or data recording is performed, the system controller 6 outputs voice coding data transferred from the digital signal processor 5 together with a control instruction to the memory control circuit 7 (step S43), and the coding data is recorded on the semiconductor memory section 10 by the memory control circuit 7.

The operation position information stored in the memory section in the system controller 6 is updated. As values to be updated, the operation end position of the index portion 10A+1 (next start position) information 10A1 and voice file size information 10A2 are updated (step S44).

The system controller 6 detects whether the stop (STOP) button ST has been pressed (step S45). If NO in step S45, the flow returns to step S36 to repeat the above operation. If YES in step S45, the operation position information stored in the memory section is recorded on the index portion 10A, and this recording process is completed.

When the system controller 6 determines that the information value VF is not "0" or data recording is not performed in step S42, when the information value VF is "1", the flow is shifted to step S45 (step S46).

When the system controller 6 determines that the information value VF is not "1" in step S46, the operation position information stored in the memory section of the system controller 6 is updated (step S47). The system controller 6 records operation position information stored in the memory section on the index portion 10A, and the recording process is completed.

The silence detecting method described above will be further described below. A recording process is to be performed in this embodiment, a CELP (Code Excited LPC) coding (analysis/synthesis type coding) scheme is used in the digital signal processor 5 to code voice data. According to the CELP scheme, a sound source signal from an LPC (Linear Prediction Coefficients) synthesis filter can be very efficiently vector-quantized by using a code book consisting of various waveform patterns.

In the first embodiment, the difference between a predicted waveform pattern extracted by this scheme and a voice signal in a predetermined zone is used as a residual signal, cross correlation between the residual signal and the voice signal in the predetermined zone is calculated, and the cross correlation is divided by auto-correlation. In this case, when the resultant value is 0.81 or less, "voiced sound" is set; when the resultant value exceeds 0.81, "unvoiced sound" or "silence" is set. However, when it is determined whether a recording operation is started in the voice start recording mode, voiced sound and unvoiced sound are handled as sound.

Silence and unvoiced sound are determined by the auto-correlation level of a voice signal. More specifically, a residual signal is originally close to a signal (white noise) generated at random. If the voice signal is correlated with the residual signal, this means that the voice signal is close to white noise. In this manner, it can be determined whether the voice signal is voiced or silent or unvoiced.

Figure 6:
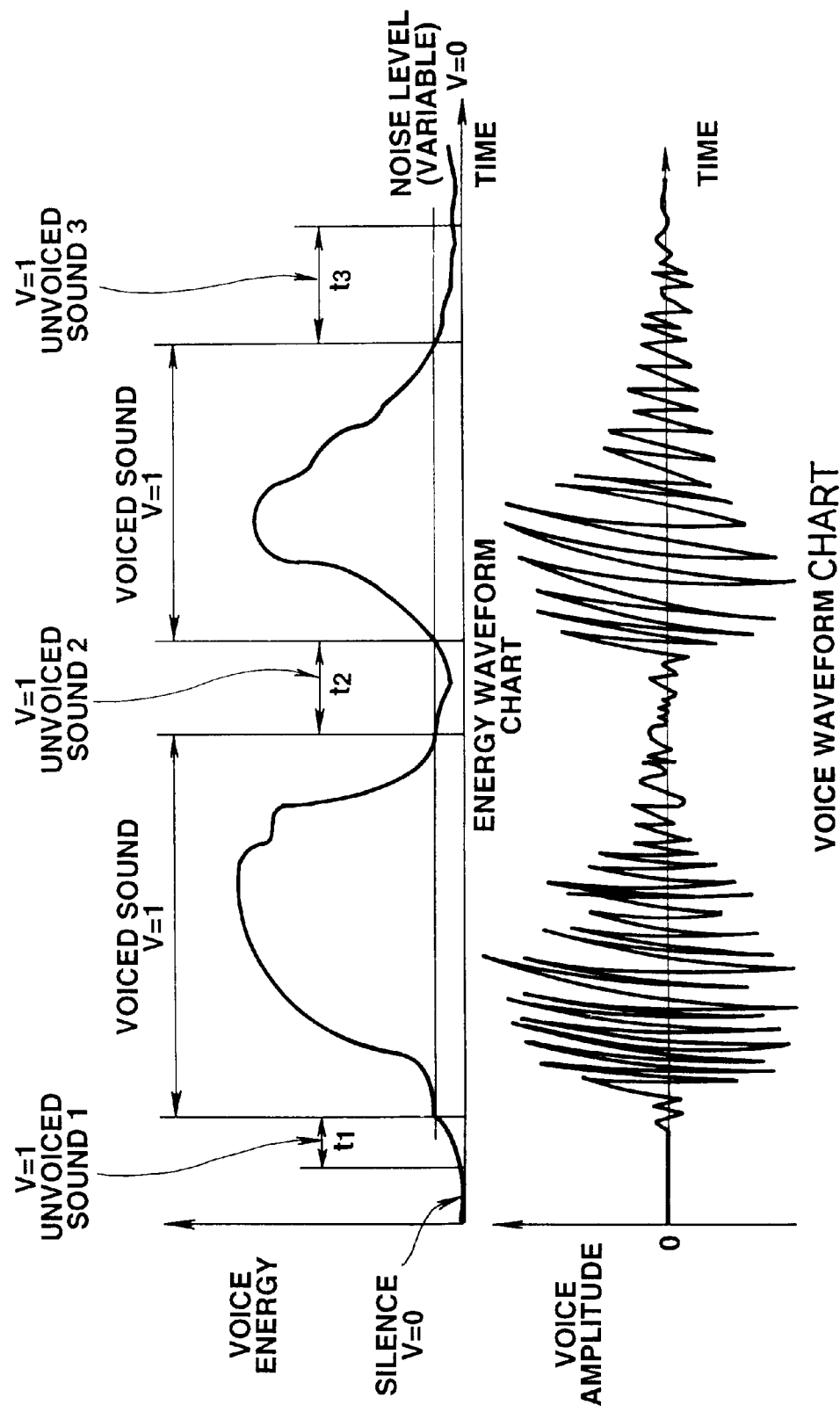
FIG. 6 is a graph showing the relationship between a voice energy waveform and a voice waveform when voiced sound, unvoiced sound, and silence are determined in the voice start recording apparatus according to the first embodiment.

Auto-correlation can be represented by a voice energy waveform, and the relationship between a voice waveform and an energy waveform is shown in FIG. 6. Referring to FIG. 6, when a noise level is determined by the above method using voice energy, since a language pattern (voice pattern) of a human being may contain unvoiced sound close to noise, the before and after zones of voiced sound are set as unvoiced zones (t1, t2, and t3) without excluding the unvoiced portion.

Figure 7:
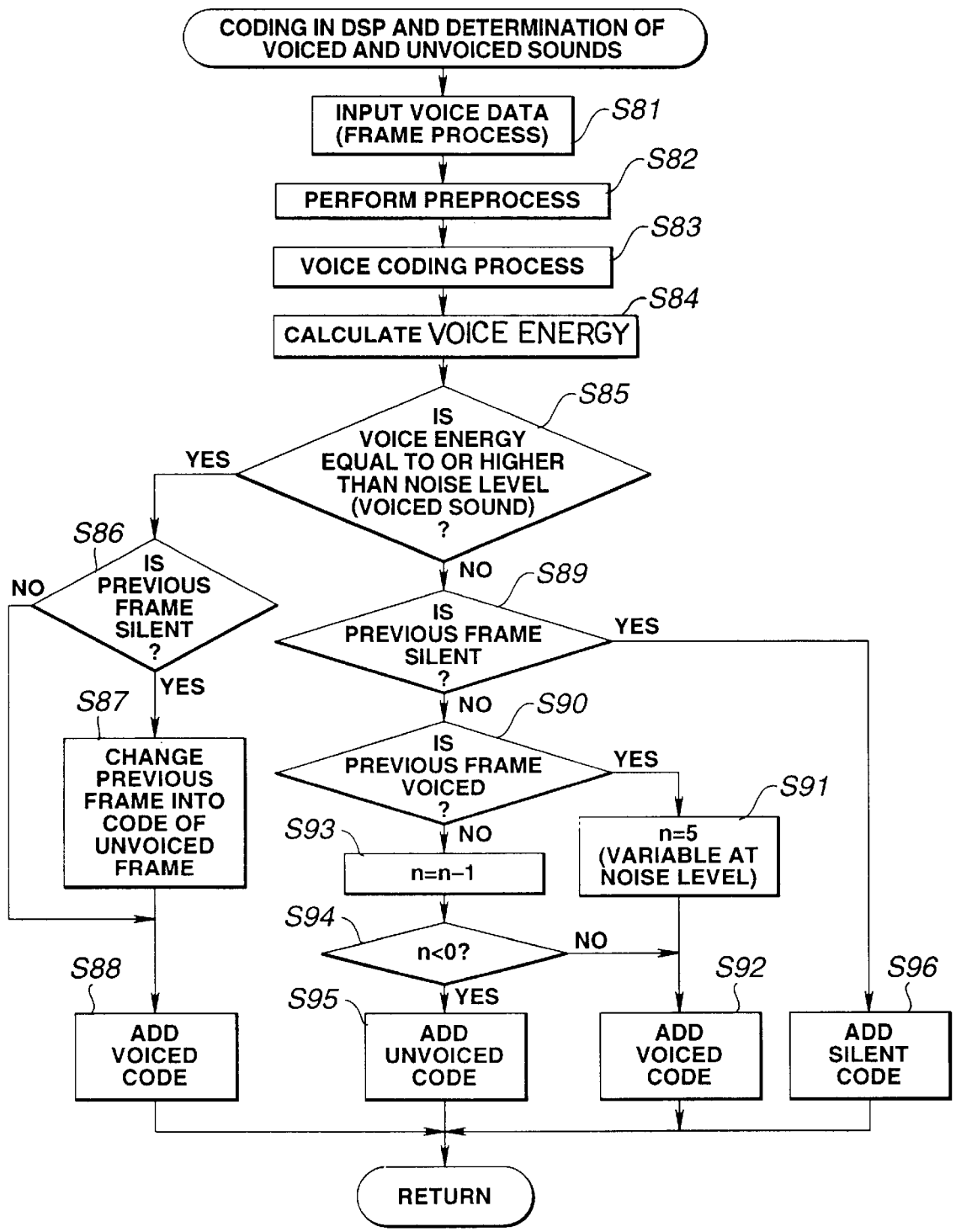
FIG. 7 is a flow chart showing a routine of a process of determining voiced sound, unvoiced sound, and silence and a coding process in the voice start recording apparatus according to the first embodiment.

In the digital signal processor 5 (DSP) and the system controller 6, as shown in FIG. 7, determination of voiced sound, unvoiced sound, and silence is performed simultaneously with a coding process.

More specifically, the digital signal processor 5 inputs voice data from the A/D converter 4 to perform a frame (data sampled for 20 ms are defined as one frame) process is performed (step S81). The digital signal processor 5 performs pre-processes such as a pre-emphasis process or a hamming window process to the sampled data (step S82). The analysis/synthesis type coding process described above is performed (step S83).

When this analysis/synthesis type coding process is performed, the voice energy (auto-correlation) of a present frame or cross correlation with a residual waveform can be obtained by the system controller 6 (step S84). At this time, by using the method described above, the system controller 6 determines, on the basis of the voice energy, whether sound is voiced sound having a level equal to or higher than a noise level (step S85). If YES in step S85, it is determined whether the previous frame or a predetermined number of previous frames are silent (step S86).

In this case, if YES in step S86, frames from the previous frame or the predetermined number of previous frames are set as unvoiced frames (step S87). A code (voiced flag) representing a voiced frame is added to the present frame (step S88), and this process is completed.

If. NO in step S86, the flow jumps to step S88.

If the system controller 6 determines that the present frame is not voiced in step S85, the system controller 6 determines whether the previous frame is silent (step S89). In this case, if the system controller 6 determines that the previous frame is not silent, the system controller 6-determines whether the previous frame is voiced (step S90). If the system controller 6 determines that the previous frame is voiced, "5" is set in the internal counter n for counting the frame number (step S91).

The system controller 6 adds a code representing an unvoiced frame (voiced flag V=1) to voice coding data (step S92), and this process is completed.

In the voice start recording apparatus according to the first embodiment, a code representing that input voice is sound or silent is used. More specifically, a code (unvoiced flag) representing unvoiced sound is added to the voice coding data, and an unvoiced portion can be easily heard when time axis compression is performed in a reproducing operation. When unvoiced sound is handled as sound, a sound flag V=1 may be added to an unvoiced frame.

If the system controller 6 determines that the previous frame is not voiced in step S90, "1" is subtracted from the value of the frame number counter n, the frame number counter is decremented by 1 (step S93). It is determined whether the value of the counter n is smaller than "0" (step S94). If YES in step S94, a code representing unvoiced sound is added to voice coding data (step S95), and this process is completed.

If the system controller 6 determines that the previous frame is silent in step S89, a code (silent flag V=0) representing that the present frame is silent (step S96), this process is completed.

In this manner, sound V=1, silence V=0, and unvoiced sound are discriminated from each other, and a code representing that is added to voice coding data. A structure in which data is recorded on the main recording medium portion 100b (memory) in the semiconductor memory section 10 is as follows. That is, the voice data portion 10B shown in FIG. 2 performs a recording operation such that a signal C (e.g., expressed by a 1-bit signal) for initializing coding is allocated to the start of each frame data and a signal V (e.g., expressed by a 1-bit signal) representing sound/silence is allocated to a position immediately after the frame data.

When a silent compressing operation is to be performed, only a portion determined as sound is recorded as voice data. However, the following process is performed. That is, 1 to 3 silent frames immediately after a change from sound to silence and a silent period of time are recorded, and, when a silent portion is reproduced, the silent portion is repetitively reproduced for the silent period of time.

Figure 8:
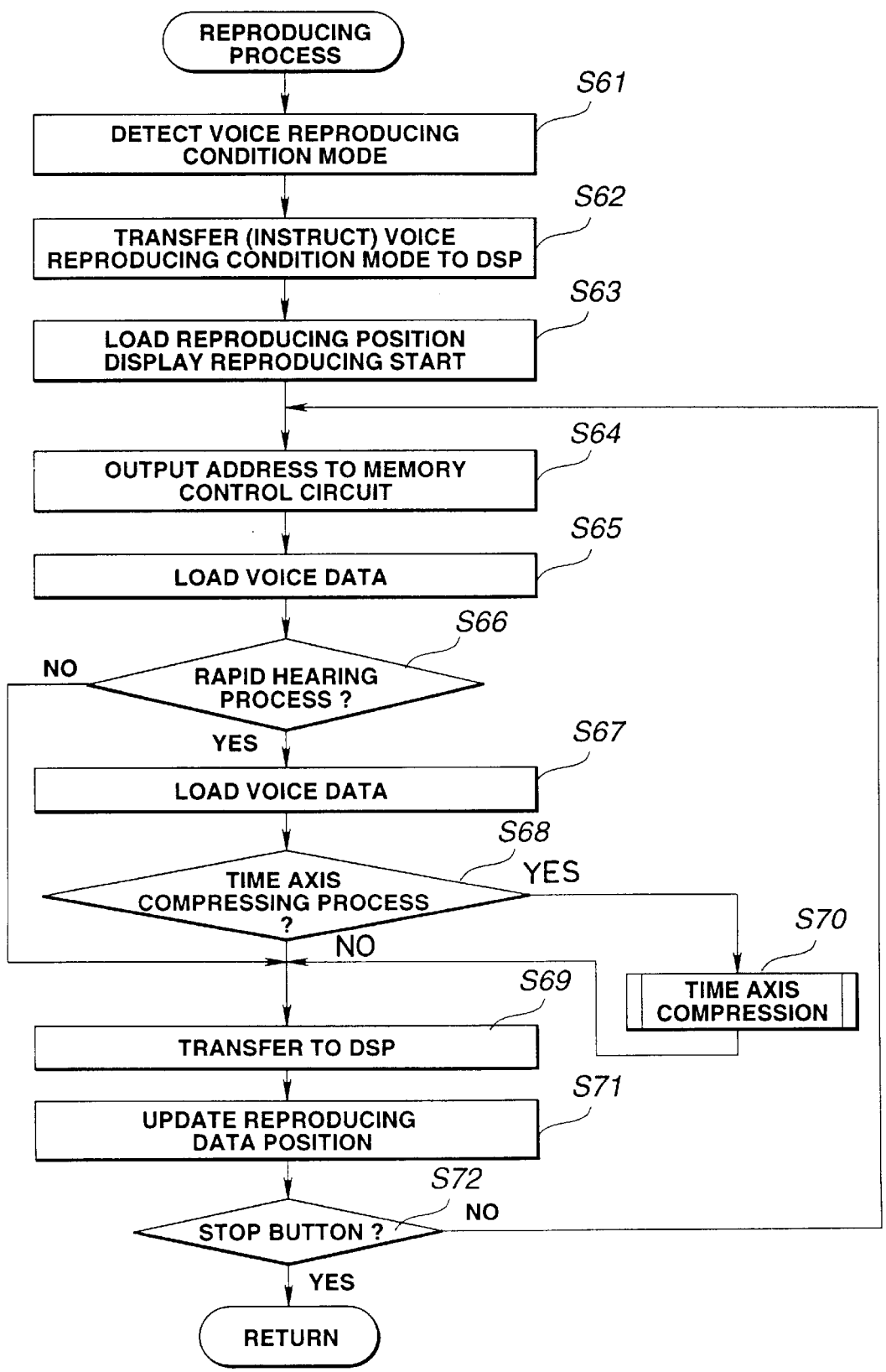
FIG. 8 is a flow chart showing a subroutine of a reproducing process in the voice start recording apparatus according to the first embodiment:a reproducing operation in a voice recording/reproducing apparatus according to a fourth embodiment of the present invention.

The subroutine of the reproducing process shown in step S15 (see FIG. 3) will be described below with reference to the flow chart shown in FIG. 8.

When the system controller 6 detects that the reproducing button PL has been pressed, the subroutine of the reproducing process is started. The system controller 6 detects the conditions (silent compression, speed reproduction, noise reduction, and the like) for voice reproduction at this time, and resets an internal counter for counting the number of read blocks (step S61). According to the detected conditions, a condition mode of the voice reproduction is sent to the digital signal processor 5 (DSP) (step S62).

Thereafter, the system controller 6 calculates a voice data read position, and controls the drive circuit 9 to display the position on the display unit 8 (step S63). In order to load a voice message file in the voice data portion 10B of the semiconductor memory section 10, the operation start position information stored in the internal memory section and an address calculated by the index portion 10A are output to the memory control circuit 7 (step S64).

In this manner, 1-block data (e.g., data obtained by dividing voice into 20-ms blocks) is loaded from the voice data portion 10B of the semiconductor memory section 10 in the system controller 6 (step S65).

In this case, the system controller 6 determines whether a rapid hearing process is performed (step S66). If YES in step S66, another 1-block data is loaded from the semiconductor memory section 10 (step S67).

The system controller 6 determines whether a time axis compressing process is performed (step S68). If NO in step S68, a data transferring process to the digital signal processor 5 (DSP) is performed (step S69).

If YES in step S68, the system controller 6 outputs an instruction for performing the time axis compressing process to the digital signal processor 5 (step S70), and data transfer is performed to the digital signal processor 5 (step S69). In the time axis compressing process at this time, for example, a TDHS (Time Domain Harmonic Synthesis) scheme is used.

The system controller 6 calculates the position (operation position) information of data to be reproduced next on the basis of data in the index portion 10A or reproducing position data stored in the internal memory section, thereby updating the reproducing position data stored in the internal memory section (step S71).

Thereafter, the system controller 6 detects a state representing whether the stop button ST (STOP button) has been press ed (step S72). If YES in step S72, the reproducing process is completed; otherwise, the flow returns to step S64 to continuously perform the reproducing process.

In this manner, according to the voice start recording apparatus of the first embodiment, a recording operation can be prevented from being erroneously started by environment noise such as door opening/closing sound or coughs, and the recording operation can be prevented from being erroneously operated by the noise or the like when the recording operation must be stopped.

A disadvantage such as cutting of a leading portion at the start of a recording operation can be prevented, use of a recording medium can be prevented from being wasted, and a speaker who talks with many intervals can efficiently use the recording medium.

In the first embodiment, the digital signal processor 5 is incorporated in the system controller 6. However, the digital signal processor 5 may be arranged independently of the system controller 6.

The second embodiment will be described below.

Figure 9:
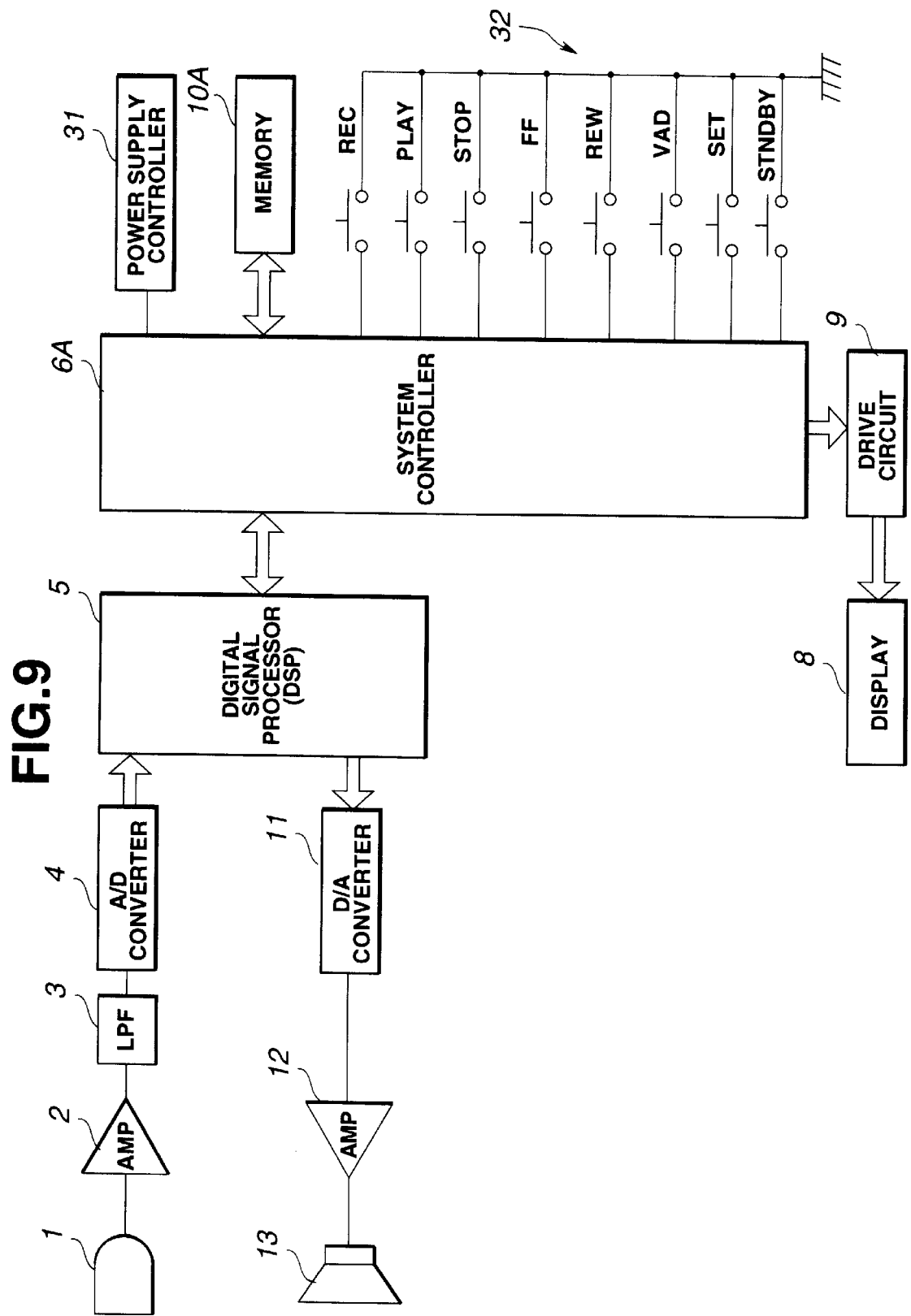
FIG. 9 is a block diagram showing the arrangement of a voice start recording apparatus according to a second embodiment of the present invention.

FIG. 9 is a block diagram showing the arrangement of a voice start recording apparatus according to the second embodiment.

As shown in FIG. 9, the voice start recording apparatus according to the second embodiment comprises a microphone 1 for converting voice into an electrical signal in the same manner as that in the first embodiment. A voice output from the microphone 1 is amplified by a microphone amplifier (AMP) 2 connected to the microphone 1. An output from the microphone amplifier 2 is input to an A/D converter 4 through a low-pass filter (LPF) 3, and an unnecessary frequency band of the analog voice signal amplified by the microphone amplifier 2 is cut out to prevent erasing noise from being generated, and the analog voice signal is inputted to the A/D converter 4.

The analog voice signal is converted into a digital signal by the A/D converter 4, and the digital signal is inputted to the digital signal processor (DSP) 5. The digital signal processor 5 is controlled by a system controller 6A (to be described later) to perform a process for compression-converting (coding) the digitally converted voice signal data on the basis of a predetermined format or a process for expansion-converting (decoding) the compressed data.

The voice signal data compressed by the digital signal processor (DSP) 5 is controlled by the system controller 6A to be recorded on a memory 10A. The arrangement and functions of the system controller 6A will be described later.

The microphone 1, the microphone amplifier 2, the low-pass filter 3, the A/D converter 4, and the digital signal processor 5 constitute a voice level detecting means.

On the other hand, the voice signal data subjected to a predetermined process by the system controller 6A is expanded by the digital signal processor 5 and input to the D/A converter 11.

The voice signal converted into an analog signal by the D/A converter 11 passes through a low-pass filter (not shown) to cut an unnecessary frequency band and to reduce quantization noise, and is input to a power amplifier (AMP) 12 for amplifying the voice signal to drive a loudspeaker. The voice signal amplified by the AMP 12 is informed by the loudspeaker 13.

The system controller 6A is constituted by a microprocessor (CPU), functions as a control means for controlling the operations of respective parts of the voice start recording apparatus, and functions as a threshold setting means.

The digital signal processor 5 and the memory (recording medium) 10A are connected to the system controller 6A.

An operation input section 32 for indicating an operation mode or the like of the voice start recording apparatus is connected to the system controller 6A, and a display unit 8 for displaying an operation mode, a recording time, and the like is connected to the system controller 6A through a drive circuit 9.

In addition , a power supply controller 31 for supplying power to circuits is connected to the system controller 6A, thereby controlling the circuits.

The operation input section 32 is constituted of various operation buttons and switches, i.e., a recording button REC serving as a recording setting operation means, a reproducing button PLAY, a stop button STOP serving as a stop mode setting operation means, a fast feeding button FF, a fast rewinding button REW, a button SET serving as a voice start sensitivity setting operation means, a button STNDBY (STANDBY) serving as a recording standby sensitivity setting operation means, and a switch VAD serving as a voice start recording mode setting means.

In the second embodiment, the voice start sensitivity setting button SET and the recording standby sensitivity setting button STANDBY are arranged in the voice start recording apparatus. However, not only buttons actually arranged in the apparatus, but also the recording button REC, the reproducing button PLAY, the stop button STOP, the fast feeding button FF, the fast rewinding button REW, and the voice start recording mode setting button VAD can be used as the voice start sensitivity setting button SET and the recording standby sensitivity setting button STANDBY, or the voice start sensitivity setting button SET and the recording standby sensitivity setting button STANDBY can be replaced with an operation of simultaneously pressing a plurality of buttons.

An operation of the voice start recording apparatus arranged as described above will be described below.

Since the basic operations such as a recording operation, a reproducing operation, a fast feeding operation, a fast rewinding operation, and the like of the second embodiment are the same as those in the first embodiment, a description thereof will be omitted. The same method of determining sound/silence as that in the first embodiment is employed in the second embodiment. However, the second embodiment is not limited to the determining method.

Figure 10:
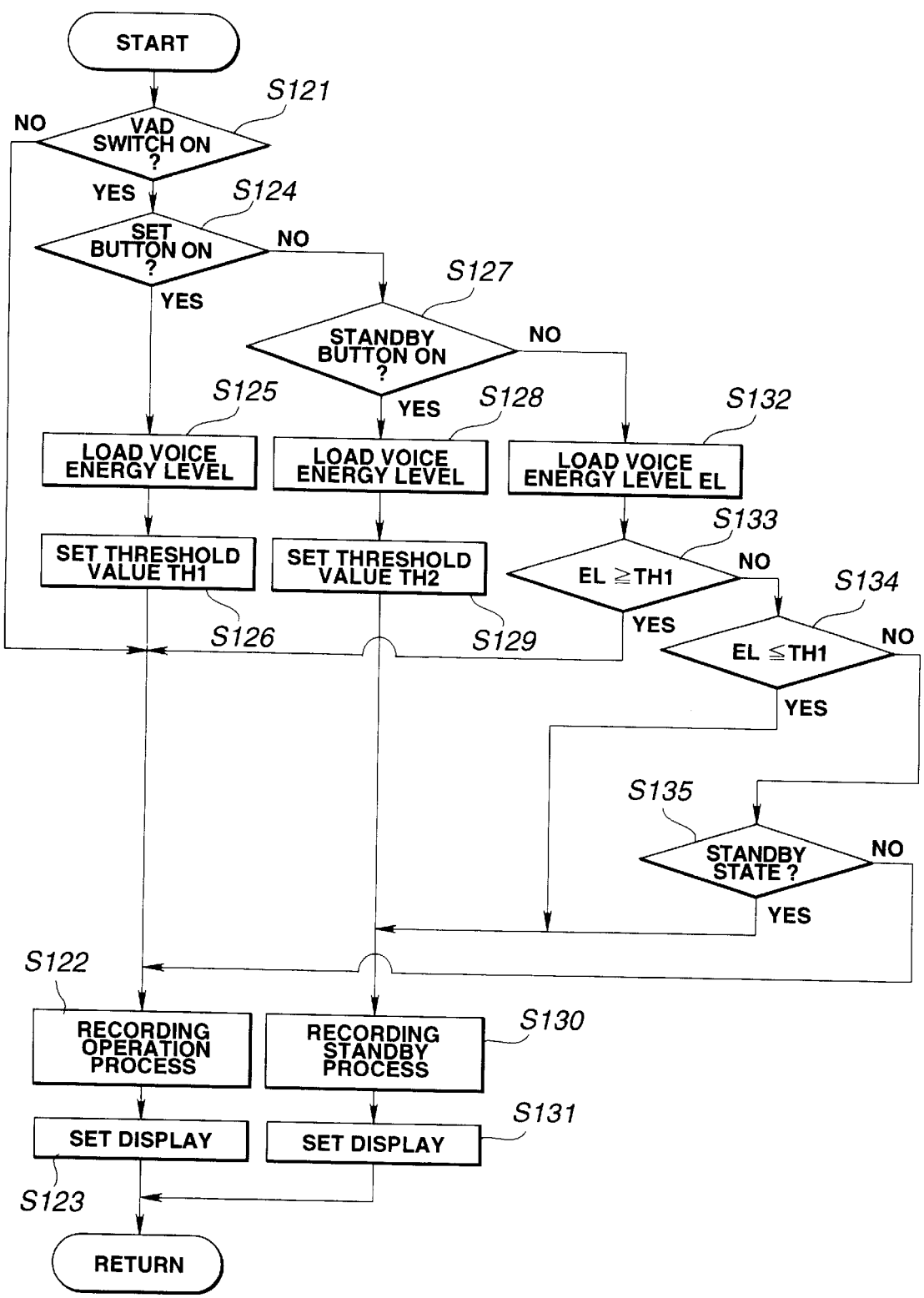
FIG. 10 is a flow chart showing a subroutine of a recording process in the voice start recording apparatus according to the second embodiment.

The subroutine of a recording process will be described below with reference to the flow chart shown in FIG. 10.

When the system controller 6A detects that the recording button REC has been pressed, the system controller 6A starts the subroutine of the recording process to detect the condition of the VAD switch at this time (step S121). If the VAD switch is set in an OFF state, the system controller 6A controls the digital signal processor 5 to compress voice information input from the A/D converter 4, and the system controller 6A starts a recording operation process for performing a recording operation to the memory 10A (steps S122 and S123).

If the VAD switch is in an ON state in step S121, the system controller 6A detects whether the voice start sensitivity setting button SET has been pressed (step S124). If YES in step S124, the system controller 6A loads the energy level of the voice detected by the digital signal processor 5 (step S125), and sets the level or a level slightly lower than that level as a first threshold value TH1 (step S126).

At the same time, the system controller 6A controls the digital signal processor 5 to compress voice information inputted from the A/D converter 4, and starts a recording operation process for performing a recording operation to the memory 10A (steps S122 and S123).

If the SET button has not been pressed in step S124, the system controller 6A detects whether the recording standby sensitivity setting button STANDBY has been pressed (step S127). If YES in step S127, the system controller 6A loads the energy level of the voice detected by the digital signal processor 5 (step S128), and sets the level or a level slightly lower than that level as a second threshold value TH2 (step S129).

At the same time, the system controller 6A stops the operation of recording the compressed voice data on the memory 10A, and starts a recording standby process (steps S130 and S131).

If the STANDBY button has not been pressed in step S127, the system controller 6A loads an energy level EL of present voice detected by the digital signal processor 5 (step S132) and compares the level EL with the threshold value TH1 or TH2 to determine whether a recording process is started or the recording standby state is set (steps S133 to S135).

In this manner, according to the second embodiment, the threshold value for determining the start of a recording operation and threshold value for determining a recording standby state are arbitrarily set independently of each other. At this time, the threshold value for determining the start of a recording operation and threshold value for determining a recording standby state may be different from each other or equal to each other.

In this embodiment described above, the two threshold values are set by the SET button and the STANDBY buttons, respectively. However, the threshold value for determining the start of a recording operation and threshold value for determining a recording standby state may be set as the same threshold value by any one of these buttons or one operation of another button.

Similarly, a predetermined reference value is set by one operation, the threshold value for determining the start of a recording operation and threshold value for determining a recording standby state may be set on the basis of the reference value.

Figure 11:
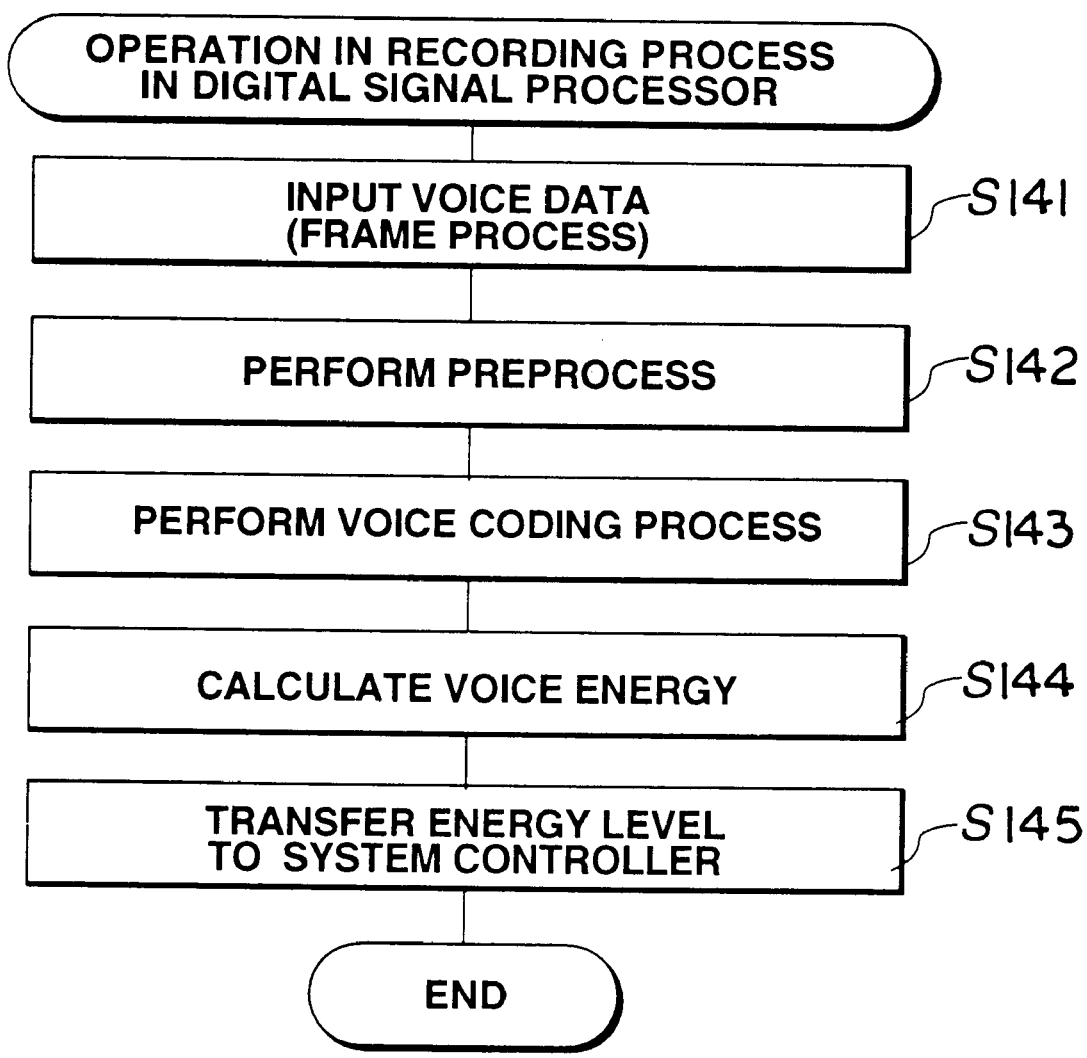
FIG. 11 is a flow chart showing an operation of a digital signal processor in a recording process in the voice start recording apparatus according to the second embodiment.

In the recording process, the digital signal processor 5, as shown in FIG. 11, simultaneously performs detection of voice energy and a coding process. More specifically, the digital signal processor 5 divides the voice data input from the A/D converter 4 in units of frames (data sampled for 20 ms are defined as one frame) (step S141).

A pre-emphasis process and a hamming window process are performed to the voice data of each frame (step S142). A voice coding process is performed (step S143). According to the process, voice energy for each frame or voice energy in units of a plurality of frames are calculated (step S144). The energy value is transferred to the system controller 6A (step S145), and this process is completed.

As described above, according to the voice start recording apparatus of the second embodiment, in the voice start recording mode, a threshold value serving as a reference for determining the start/standby of the recording operation can be set on the basis of a voice level when the voice start sensitivity setting button SET or the recording standby sensitivity setting button STANDBY has been pressed. For this reason, a trial recording operation need not be performed in advance, and the voice start level or the recording standby level can be reliably and easily started.

In the second embodiment, the system controller 6A sets the threshold values, and compares each threshold value and the present voice energy level. However, the setting and comparison can be performed by the digital signal processor 5.

The digital signal processor 5 may be incorporated in the system controller 6A as in the first embodiment.

In the second embodiment, unless the voice start recording mode is set, the above threshold values and the like cannot be set. That is, the setting is performed only when the VAD switch is in an ON state in step S121. However, even if the voice start recording mode is set, the threshold values and the like may be set in advance by operating, e.g., a devoted button or switch, or the recording button REC, the stop button STOP, and the like.

In this manner, when the voice start recording mode is set, the start and standby of the apparatus can be controlled on the basis of the predetermined threshold values.

The above operation members are operated by applying operation farce to the operation members such that the operation members are pressed downward or slid. The operation members are designed such that the positions of the operation members automatically return to original states (positions) by urging force of springs or the like when the operation force is canceled. In addition, a signal generated when the operation members are operated is output to the system controller 6A.

The voice start recording apparatuses according to the third, fourth, and fifth embodiments, each of which has the same circuit arrangement as that of the voice start recording apparatus according to the second embodiment, but has a system controller operation different from that of the voice start recording apparatus according to the second embodiment, will be sequentially described below.

An operation of a system controller 6A when a recording operation is performed in the voice start recording apparatus according to the third embodiment will be described below with reference to the flow chart in FIG. 12.

Figure 12:
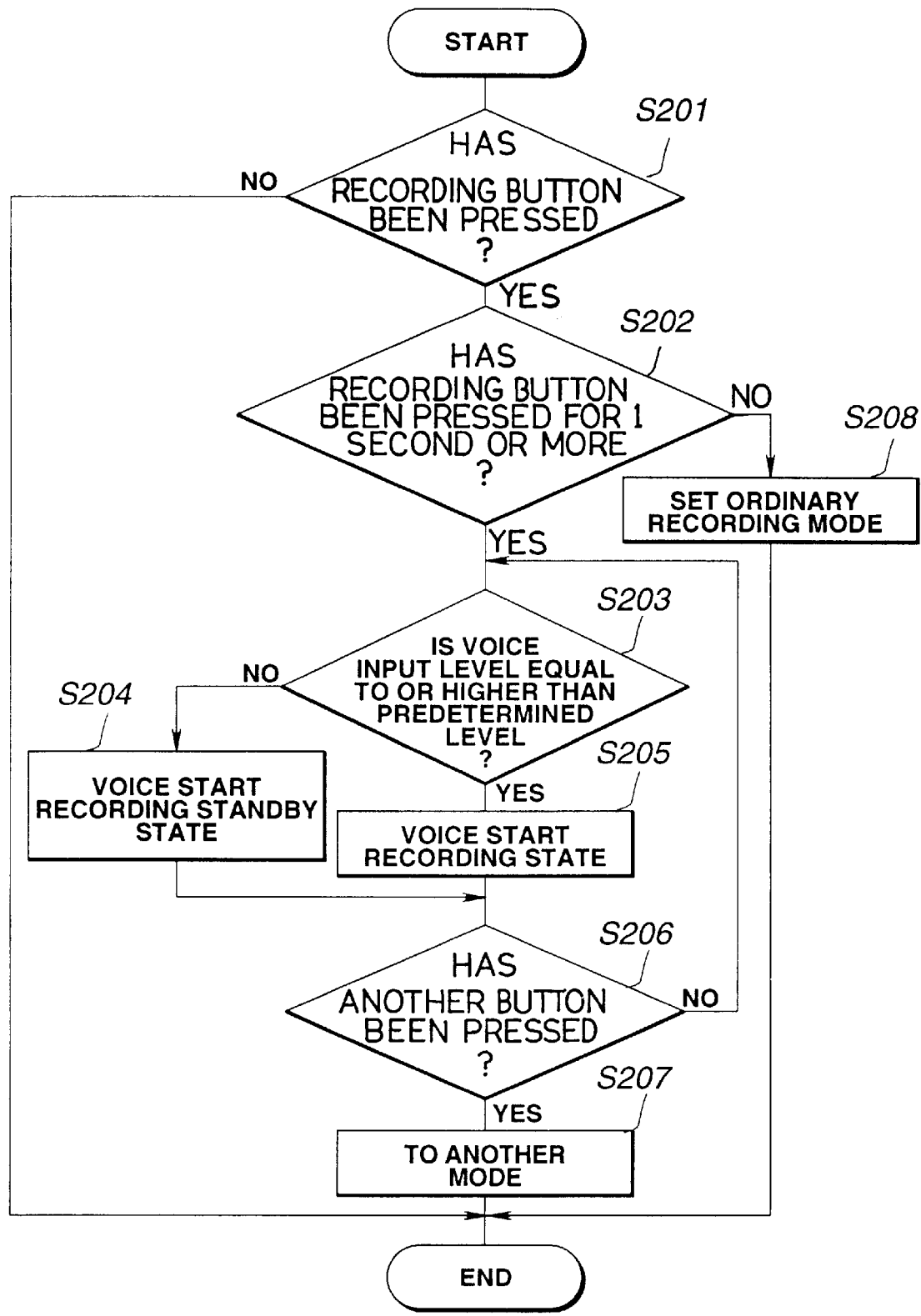
FIG. 12 is a flow chart showing an operation of a system controller when a recording operation is performed in a third embodiment of the present invention.

As an initial state in FIG. 12, the voice start recording apparatus is in an ON state wherein its main power supply is turned on, and it is assumed that the recording apparatus is set in a stop state or a state other than a recording state.

In this initial state, as shown in FIG. 12, the system controller 6 determines, in step S201, whether a recording button REC for setting a recording mode to perform a recording operation in the operation input section 32 is in an ON state. In this case, if the system controller 6A determines that the recording button REC has been pressed, the system controller 6A starts a process in step S202.

If the system controller 6A determines that the recording button REC has not been pressed, i.e., the initial state is kept, in step S201, a series of sequences (recording operation) in the flow chart shown in FIG. 12 are ended.

The system controller 6A determines, in step S202, whether the recording button REC has been pressed for a predetermined period of time or more, e.g., whether the recording button REC has been continuously pressed for 1 second or more. In this case, if NO in step S202, the flow is shifted to step S208 to set the apparatus in an ordinary recording mode, and the series of sequences are ended.

If the system controller 6A determines that the recording button REC has been continuously pressed for 1 second or more in Step S202, i.e., determines that a predetermined operation different from an operation for setting a recording mode by the recording button REC has been performed, the recording apparatus of this embodiment is set in a voice start recording mode to make it possible to perform the operation of the voice start recording means, and the flow is shifted to step S203.

In step S203, an input level of a voice signal or the like input to the microphone 1 is determined. In this case, if it is determined that the input level of the voice signal or the like input to the microphone 1 is equal to or higher than a predetermined level, the flow is shifted to the process in step S205. In step S205, the voice start recording state is set, i.e., a recording operation is automatically started.

The process in step S206 is thereafter started. In step S206, it is determined whether a button other than the recording button REC in the operation input section 32 has been pressed.

In step S203, if it is determined that the input level of the voice signal or the like input to the microphone 1 is not equal to or higher than the predetermined level, i.e., that the input level does not reach the predetermined level, the process in step S204 is started.

In step S204, the voice start recording standby state is set, i.e., the recording operation is temporarily stopped in a state wherein the voice start recording mode is set, and the recording operation standby state is set.

The process in step S206 is started, and it is determined whether a button other than the recording button in the operation input section 32 has been pressed.

In step S206, if it is determined that a button other than the recording button REC in the operation input section 32 has not been pressed, the voice start recording mode is kept set, the flow returns to step S203, and processes following step S203 are repeated.

In step S206, if it is determined that a button other than the recording button REC in the operation input section 32 has been pressed, setting of the voice start recording mode is canceled, and the process in step S207 is started.

In step S207, the mode is switched to another mode corresponding to the button other than the recording button REC pressed in step S206, and a series of sequences of the recording operation are ended.

As described above, in the voice start recording apparatus according to the third embodiment, when the recording button REC in the operation input section 32 has been pressed for 1 second or more, the voice start recording mode is set (steps S202 and S203).

When the recording button REC in the operation input section 32 has been continuously operated for shorter than 1 second, the ordinary recording mode is set (steps S202 and S208).

By continuously pressing the recording button REC for a predetermined period of time or more, a switching operation to the voice start recording mode is performed. On the other hand, by only pressing the recording button REC for shorter than a predetermined period of time when the voice start recording mode is set (step S207), the voice start recording mode is canceled.

As described above, according to the third embodiment, a devoted button need not be specially arranged to perform a switching operation to the recording mode, and a cumbersome operation need not be performed. In addition, by arbitrarily operating the recording button REC for performing the recording operation, a mode switching operation between the voice start recording mode and the ordinary recording mode can be easily performed.

Therefore, since the number of parts need not be increased, the third embodiment can contribute to a decrease in size of the apparatus itself and to a decrease in manufacturing cost.

Since a devoted switch or the like for mode switching is not specially arranged, the following accident can be prevented. That is; a switching operation to the voice start recording mode is unexpectedly performed by an operation error or the like caused when the devoted switch is operated.

An operation of a voice start recording apparatus according to the fourth embodiment of the present invention will be described below with reference to FIG. 13.

Figure 13:
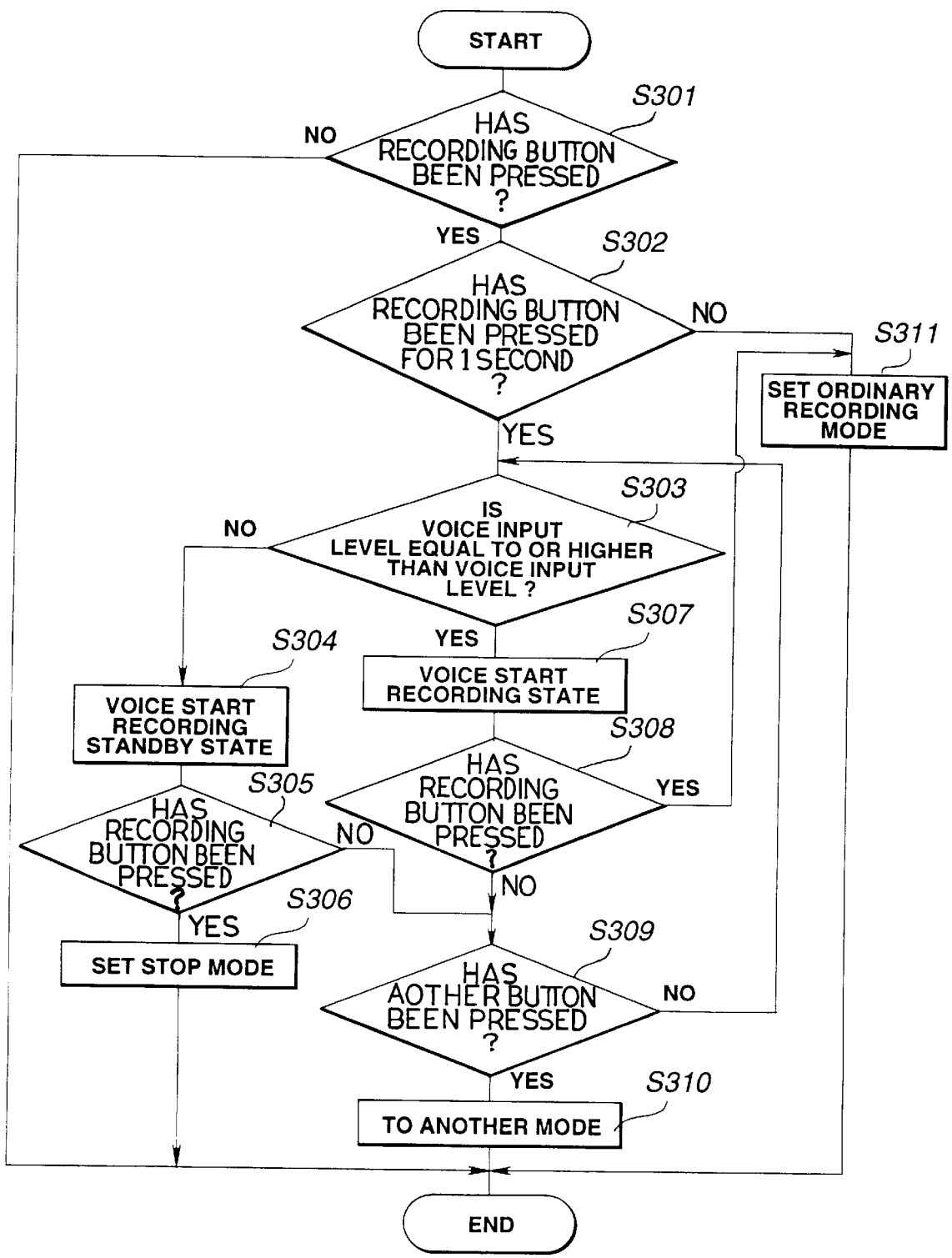
FIG. 13 is a flow chart showing an operation of a system controller when a recording operation is performed in the fourth embodiment of the present invention.

FIG. 13 is a flow chart showing an operation of a system controller 6A when a recording operation is performed in the voice start recording apparatus according to the fourth embodiment of the present invention. In an operation sequence in a recording operation in the fourth embodiment, the operations from steps S301 to S303 shown in FIG. 13 are the same operation sequence as the operations in steps S201 to S203 in the flow chart shown in FIG. 12. Therefore, a description of their operations will be omitted, and operations following step S303 will be described below.

As shown in FIG. 13, in step S302, as in step S202 shown in FIG. 12, the voice start recording apparatus according to the fourth embodiment is set in a voice start recording mode, a voice start recording means can be operated, and the process in step S303 is started.

In step S303, determination of the input level of a voice signal input of the microphone 1 is performed. In this case, if it is determined that the input level of the voice signal input to the microphone 1 is equal to or higher than a predetermined level, the process in step S307 is started.

In step S307, the voice start recording state is set, i.e., a recording operation is automatically started. The process in step S308 is started.

It is determined, in step S308, whether a recording button REC has been pressed.

In step S303, if it is determined that the input level of the voice signal or the like input to the microphone 1 is no t equal to or higher than the predetermined level, i.e., that the input level does not reach the predetermined level, the process in step S304 is started.

In step S304, the voice start recording standby state is set, i.e., a recording operation standby state wherein the recording operation is temporarily stopped in a state wherein the voice start recording mode is set is set. The flow is shifted to step S305 to determine whether the recording button REC has been pressed.

If NO in either step S305 or S308, the process in step S309 is started.

It is determined, in step S309, whether a button other than the recording button REC has been pressed. In this case, if it is determined that the button other than the recording button REC has not been pressed, the voice start recording mode is kept set, the process in step S303 is restarted to repeat the following processes.

If it is determined, in step S308, that the recording button REC has been pressed, setting of the voice start recording mode is canceled while the recording operation is kept performed, and the process in step S311 is started.

A switching operation to an ordinary recording mode is performed in step S311, and the series of sequences are ended.

If it is determined, in step S305, that the recording button REC has been pressed, the voice start recording standby state is canceled, setting of the voice start recording mode is canceled, and the process in step S306 is started. In step S306, the set mode of the apparatus is switched to a stop mode, and the series of sequences are ended.

If it is determined, in step S309, whether a button other than the recording button REC in the operation input section 32 has been pressed, the process in step S310 is started. The setting of the voice start recording mode is canceled, and the mode is switched to another mode corresponding to the button other than the recording button REC pressed in step S306, and the series of sequences of the recording operation are ended.

As described above, in the fourth embodiment, as in the third embodiment, by a predetermined operation of the recording button REC for performing the recording operation, a mode switching operation between the voice start recording mode and the ordinary recording mode can be easily performed.

Therefore, since the number of parts need not be increased, the fourth embodiment can contribute to a decrease in size of the apparatus itself and to a decrease in manufacturing cost.

An operation of the voice start recording apparatus according to the fifth embodiment of the present invention will be described below with reference to FIG. 14.

Figure 14:
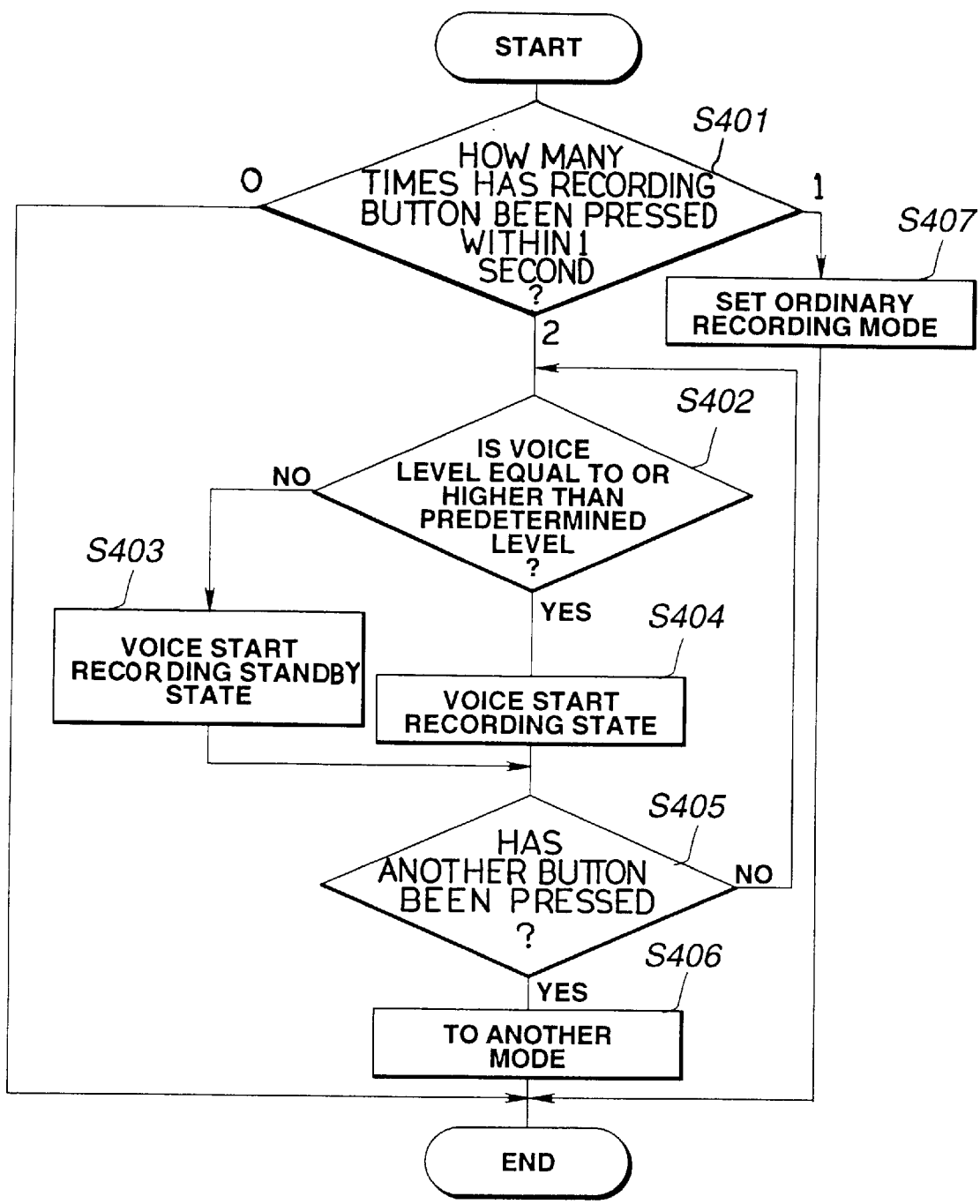
FIG. 14 is a flow chart showing an operation of a system controller when a recording operation is performed in a fifth embodiment of the present invention.

FIG. 14 is a flow chart showing an operation of a system controller 6A when a recording operation is performed in the voice start recording apparatus according to the fifth embodiment of the present invention.

As an initial state in FIG. 14, the voice start recording apparatus is in an ON state wherein its main power supply is turned on, and it is assumed that the recording apparatus is set in a stop state or a state other than a recording state.

In this initial state, as shown in FIG. 14, it is checked, in step S401, the number of times of pressing a recording button REC for setting a recording mode to perform a recording operation in the operation input section 32 within a predetermined period of time, e.g., 1 second. In this case, if the recording button REC has been pressed twice (or more times) within a predetermined period of time (1 second), the apparatus is set in a voice start recording mode, and the process in step S402 is started.

If the recording button REC has been pressed only once within a predetermined period of time (1 second) in step S401, the flow is shifted to step S407. In step S407, the apparatus is set in an ordinary recording mode, and the series of sequences are ended.

If it is determined, in step S401, that the recording button REC has been pressed 0 times within a predetermined period of time (1 second), i.e., that the recording button REC has not been pressed, the sequence of the recording operation shown in this flow chart is ended.

As described above, if it is determined, in step S401, that the recording button REC has been pressed twice (or more) within the predetermined period of time (1 second), the apparatus is set in the voice start recording mode. Thereafter, the flow is shifted to step S402.

In step S402, determination of the input level of a voice signal or the like input to the microphone 1 is performed. In this case, if it is determined that the input level of the voice signal or the like input to the microphone 1 is equal to or higher than a predetermined level, the flow is shifted to step S404. In step S404, a voice start recording state, i.e., a recording operation is automatically started. In step S405, it is determined whether a button other than the recording button REC has been pressed.

If it is determined, in step S402, that the input level of the voice signal input to the microphone 1 is not equal to or higher than the predetermined level, i.e., that the input level does not reach the predetermined level, the flow is shifted to step S403. In step S403, the voice start recording standby state is set, i.e., a recording operation standby state wherein the recording operation is temporarily stopped in a state wherein the voice start recording mode is set is set. The flow is shifted to step S405 to determine whether the recording button REC or another button has been pressed.

If it is determined, in step S405, that a button other than the recording button REC has not been pressed, the voice start recording mode is kept set, and the flow returns to step S402 to repeat the following processes.

If it is determined, in step S405, that a button other than the recording button REC has been pressed, the setting of the voice start recording mode is canceled, and the flow is shifted to step S406. The mode is switched to another mode corresponding to the button other than the recording button REC pressed in step S405, and the series of sequences of the recording operation are ended.

As described above, in the voice start recording apparatus according to the fifth embodiment, a mode switching operation between the ordinary recording mode and the voice start recording mode of the recording modes is performed depending on the number of times of pressing the recording button REC in the operation input section 32 within the predetermined period of time (e.g., 1 second). The operation of the voice start recording means can thus be performed by pressing the recording button REC a plurality of times.

More specifically, when the recording button REC in the operation input section 32 has been pressed once within 1 second, the ordinary recording mode is set. On the other hand, when the recording button REC has been pressed a plurality of times within 1 second, the voice start recording mode is set.

When a button other than the recording button REC has been pressed in the voice start recording mode, i.e., in a state wherein the voice start recording means can be operated, the voice start recording mode is canceled. In this case, for example, the mode is switched to another mode such as a stop mode or an ordinary recording mode.

As described above, according to the fifth embodiment, the same effect as obtained in the third or fourth embodiment can be obtained.

In the third to fifth embodiments, a digital recorder is used as the voice start recording apparatus. However, the voice start recording apparatus is not limited to the digital recorder, and the present invention can be applied to an analog recorder using a magnetic tape or the like as a recording medium. In this case, the same effect as described above can be easily obtained.

In this invention, it is apparent that working modes different in a wide range can be formed on this basis of this invention without departing from the spirit and scope of the invention. This invention is not restricted by any specific embodiment except as may be limited by the appended claims.

What is claimed is:

1. A voice start recording apparatus comprising:
   voice level determining means for determining whether input voice is sound or silent in units of frames, each of which frames codes a voice signal;
   continuity monitoring means for monitoring continuity of sound frames or silent frames; and
   recording control means for controlling a start and a stop of a recording operation based on an output from said continuity monitoring means;
   threshold value setting means for setting a threshold value for determining whether a voice is sound or silent in said sound level determining means;
   voice level detecting means for detecting a level of an input voice;
   voice start sensitivity setting operation means; and
   voice standby sensitivity setting operation means,
   wherein said threshold value setting means sets a threshold value based on a voice level when a voice start sensitivity setting operation or a voice standby sensitivity setting operation is preformed.

2. A voice start recording apparatus according to claim 1, wherein a threshold value for determining a level at which a recording operation is started is different from a threshold value for determining a level at which a recording operation is on standby.

3. A voice start recording apparatus according to claim 1, wherein a threshold value for determining a level at which a recording operation is started is equal to a threshold value for determining a level at which a recording operation is on standby.

4. A voice start recording apparatus comprising:
   voice level determining means for determining whether input voice is sound or silent in units of frames, each of which frames codes a voice signal;
   continuity monitoring means for monitoring continuity of sound frames of silent frames;
   recording control means for controlling a start and a stop of a recording operation based on an output from said continuity monitoring means;
   voice level detecting means for detecting a level of an input voice; and
   recording mode setting operation means for setting a recording mode,
   wherein a voice start sensitivity setting operation is performed by said recording mode.

5. A start recording apparatus comprising:
   voice level determining means for determining whether input voice is sound or silent in units of frames, each of which frames codes a voice signal;
   continuity monitoring means for monitoring continuity of sound frames or silent frames;
   threshold value setting means for setting a threshold value for determining whether a voice is sound or silent in said sound level determining means;
   voice level detecting means for detecting a level of an input voice;
   recording control means for controlling a start and a stop of a recording operation based on an output from said continuity monitoring means; and
   stop mode setting operation means for setting a stop mode,
   wherein a voice standby sensitivity setting operation is performed by said stop mode setting operation means.

6. A voice start recording apparatus comprising:
   voice level determining means for determining whether input voice is sound or silent in units of frames, each of which frames codes a voice signal;
   continuity monitoring means for monitoring continuity of sound frames or silent frames; and
   recording control means for controlling a start and a stop of a recording operation based on an output from said continuity monitoring means; and
   recording mode setting operation means for setting a recording mode,
   wherein a voice start recording operation mode is set when a predetermined operation different from an operation for setting a recording mode is performed by said mode setting operation means.

7. A voice start recording apparatus according to claim 6, wherein a voice start recording mode is set in such a manner that said recording mode setting operation means is continuously and externally operated for at least a predetermined period of time.

8. A voice start recording apparatus according to claim 6, wherein a voice start recording mode is set in such a manner that said recording mode setting operation means is externally operated a plurality of times within a predetermined period of time.

9. A voice start recording apparatus according to claim 6, wherein a voice start recording mode is canceled when said recording mode operation setting means is operated with the voice start recording mode set.

10. A voice start recording apparatus comprising:
    voice level determining means for determining whether input voice is sound or silent in units of frames, each of which frames codes a voice signal;

continuity monitoring means for monitoring continuity of sound frames or silent frames;

recording means for controlling a start and a stop of a recording operation based on an output from said continuity monitoring means; and means capable of selecting at least either a continuous recording mode or a voice start recording mode as a recording mode;

wherein the recording mode becomes the voice start recording mode if silent frames at least equal to a predetermined number are continuously inputted when the continuous recording mode is selected as the recording mode; and recording is stopped if silent frames at least equal to a predetermined number are continuously inputted when the voice start recording mode is selected as the recording mode.

11. A voice start recording apparatus comprising:

voice level determining means for determining whether input voice is sound or silent in units of frames, each of which frames codes a voice signal;

continuity monitoring means for monitoring continuity of sound frames; and recording control means for controlling a start of a recording operation based on an output from said continuity monitoring means when the continuity monitoring means detects a given number of consecutive sound frames;

said control means including means for starting a recording operation when a predetermined number of sound frames are continuously detected by said continuity monitoring means in a recording standby state;

threshold value setting means for setting a threshold value for determining whether a voice is sound or not in said sound level determining means; and voice level detecting means for detecting a level of an input voice; and voice start sensitivity setting operation means, wherein said threshold value setting means sets a threshold value based on a voice level when a voice start sensitivity setting operation is performed.

12. A voice start recording apparatus comprising:

voice level determining means for determining whether input voice is sound or silent in units of frames, each of which frames codes a voice signal;

continuity monitoring means for monitoring continuity of sound frames; and recording control means for controlling a start of a recording operation based on an output from said continuity monitoring means when the continuity monitoring means detects a given number of consecutive sound frames;

said control means including means for starting a recording operation when a predetermined number of sound frames are continuously detected by said continuity monitoring means in a recording standby state;

threshold value setting means for setting a threshold value for determining whether a voice is sound or not in said sound level determining means; and a voice level detecting means for detecting a level of an input voice; and voice standby sensitivity setting operation means, wherein said threshold value setting means sets a threshold value base on a voice level when a voice standby sensitivity setting operation is performed.

* * * * *